(12) United States Patent
Robertson et al.

(10) Patent No.: US 10,779,472 B2
(45) Date of Patent: Sep. 22, 2020

(54) ROBOTIC FRUIT PICKING SYSTEM

(71) Applicant: DOGTOOTH TECHNOLOGIES LIMITED, Royston (GB)

(72) Inventors: Duncan Robertson, Royston (GB); Matthew Cook, Royston (GB); Edward Herbert, Royston (GB); Frank Tully, Royston (GB)

(73) Assignee: DOGTOOTH TECHNOLOGIES LIMITED, Royston (GB)

(*) Notice: Subject to any disclaimer, the term of this patent is extended or adjusted under 35 U.S.C. 154(b) by 0 days.

(21) Appl. No.: 16/406,505

(22) Filed: May 8, 2019

(65) Prior Publication Data
US 2019/0261566 A1    Aug. 29, 2019

Related U.S. Application Data

(63) Continuation of application No. PCT/GB2017/053367, filed on Nov. 8, 2017.

(30) Foreign Application Priority Data

Nov. 8, 2016    (GB) .................................. 1618809.6

(51) Int. Cl.
*G05B 15/00*    (2006.01)
*G05B 19/00*    (2006.01)
(Continued)

(52) U.S. Cl.
CPC .............. *A01D 46/30* (2013.01); *A01D 46/22* (2013.01); *A01D 46/243* (2013.01);
(Continued)

(58) Field of Classification Search
CPC ...... A01D 46/30; A01D 46/22; A01D 46/243; A01D 46/253; B25J 9/1679; B25J 9/1697;
(Continued)

(56) References Cited

U.S. PATENT DOCUMENTS

| 4,519,193 A | 5/1985 | Yoshida et al. |
| 4,718,223 A * | 1/1988 | Suzuki .................. A01D 46/30 |
| | | 56/328.1 |

(Continued)

FOREIGN PATENT DOCUMENTS

| CN | 103 503 639 A | 1/2014 |
| JP | 2004 180554 A | 7/2004 |
| KR | 2015 0105661 A | 9/2015 |

OTHER PUBLICATIONS

International Search Report, dated Feb. 26, 2018, issued in international Application No. PCT/GB2017/053367.

*Primary Examiner* — Harry Y Oh
(74) *Attorney, Agent, or Firm* — Saul Ewing Arnstein & Lehr LLP

(57) ABSTRACT

A robotic fruit picking system includes an autonomous robot that includes a positioning subsystem that enables autonomous positioning of the robot using a computer vision guidance system. The robot also includes at least one picking arm and at least one picking head, or other type of end effector, mounted on each picking arm to either cut a stem or branch for a specific fruit or bunch of fruits or pluck that fruit or bunch. A computer vision subsystem analyses images of the fruit to be picked or stored and a control subsystem is programmed with or learns picking strategies using machine learning techniques. A quality control (QC) subsystem monitors the quality of fruit and grades that fruit according to size and/or quality. The robot has a storage subsystem for storing fruit in containers for storage or transportation, or in punnets for retail.

28 Claims, 31 Drawing Sheets

(51) Int. Cl.
| | |
|---|---|
| A01D 46/30 | (2006.01) |
| A01D 46/22 | (2006.01) |
| A01D 46/24 | (2006.01) |
| A01D 46/253 | (2006.01) |
| B25J 9/16 | (2006.01) |
| B25J 11/00 | (2006.01) |
| B25J 15/00 | (2006.01) |
| G06T 7/50 | (2017.01) |
| G06T 7/11 | (2017.01) |
| G06T 7/90 | (2017.01) |
| G06T 7/70 | (2017.01) |
| A01D 46/28 | (2006.01) |
| G06K 9/00 | (2006.01) |
| G06K 9/62 | (2006.01) |
| G06Q 30/02 | (2012.01) |
| G06T 7/00 | (2017.01) |
| G06T 7/60 | (2017.01) |
| A01G 9/14 | (2006.01) |
| B25J 9/00 | (2006.01) |
| B25J 9/06 | (2006.01) |
| G05D 1/02 | (2020.01) |

(52) U.S. Cl.
CPC .......... *A01D 46/253* (2013.01); *A01D 46/28* (2013.01); *A01G 9/143* (2013.01); *B25J 9/1679* (2013.01); *B25J 9/1697* (2013.01); *B25J 11/00* (2013.01); *B25J 15/0019* (2013.01); *G06K 9/00664* (2013.01); *G06K 9/626* (2013.01); *G06K 9/6257* (2013.01); *G06K 9/6282* (2013.01); *G06Q 30/0283* (2013.01); *G06T 7/0004* (2013.01); *G06T 7/11* (2017.01); *G06T 7/50* (2017.01); *G06T 7/60* (2013.01); *G06T 7/70* (2017.01); *G06T 7/90* (2017.01); *B25J 9/0084* (2013.01); *B25J 9/06* (2013.01); *B25J 15/0033* (2013.01); *G05B 2219/45003* (2013.01); *G05D 1/0219* (2013.01); *G05D 2201/0201* (2013.01); *G06K 2209/17* (2013.01); *G06T 2207/10048* (2013.01); *G06T 2207/20081* (2013.01); *G06T 2207/20084* (2013.01); *G06T 2207/30128* (2013.01); *Y02A 40/252* (2018.01)

(58) Field of Classification Search
CPC .................. B25J 11/00; B25J 15/0019; G05B 2219/45003
See application file for complete search history.

(56) References Cited

U.S. PATENT DOCUMENTS

| | | | |
|---|---|---|---|
| 6,145,291 A * | 11/2000 | Jarmain | A01D 46/28 56/328.1 |
| 9,468,152 B1 | 10/2016 | Jens et al. | |
| 2005/0126144 A1* | 6/2005 | Koselka | A01D 46/30 56/10.2 R |
| 2006/0213167 A1* | 9/2006 | Koselka | A01D 46/30 56/10.2 A |
| 2008/0010961 A1* | 1/2008 | Gray | A01D 46/30 56/10.2 A |
| 2010/0050585 A1* | 3/2010 | Amaro | A01D 46/24 56/13.5 |
| 2010/0292841 A1* | 11/2010 | Wickham | B25J 9/1679 700/259 |
| 2011/0022231 A1* | 1/2011 | Walker | A01D 46/264 700/259 |
| 2011/0252760 A1* | 10/2011 | Bravo Trinidad | A01D 46/30 56/10.2 A |
| 2014/0277694 A1* | 9/2014 | Ichimaru | B65G 1/137 700/218 |
| 2017/0000027 A1* | 1/2017 | Hunt | A01D 46/30 |
| 2017/0273241 A1* | 9/2017 | Salisbury | A01D 46/005 |
| 2018/0092304 A1* | 4/2018 | Moore | B25J 5/007 |
| 2018/0263188 A1* | 9/2018 | Herman | A01G 3/00 |

* cited by examiner

ROBOTIC FRUIT PICKING SYSTEM

CROSS-REFERENCE TO RELATED APPLICATIONS

This is a continuation of PCT Application No. PCT/GB2017/053367, filed on Nov. 8, 2017, which claims priority to GB Application No. GB 1618809.6, filed on Nov. 8, 2016, the entire contents of each of which being fully incorporated herein by reference.

BACKGROUND OF THE INVENTION

1. Field of the Invention

The field of the invention relates to systems and methods for robotic fruit picking.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Horticultural producers depend critically on manual labour for harvesting their crops. Many types of fresh produce are harvested manually including berry fruits such as strawberries and raspberries, asparagus, table grapes and eating apples. Manual picking is currently necessary because the produce is prone to damage and requires delicate handling, or because the plant itself is valuable, producing fruit continuously over one or more growing seasons. Thus the efficient but destructive mechanical methods used to harvest crops such as wheat are not feasible.

Reliance on manual labour creates several problems for producers:

Recruiting pickers for short, hard picking seasons is risky and expensive. Domestic supply of picking labour is almost non-existent and so farmers must recruit from overseas. However, immigration controls place a large administrative burden on the producer and increase risk of labour shortage. Supply and demand for low-skilled, migrant labour are unpredictable because they depend on weather conditions throughout the growing season and economic circumstances. This creates significant labour price fluctuations.

In extremis, this can lead to crops being left un-harvested in the field. E.g. a single 250-acre strawberry farm near Hereford lost more than £200K of produce because of labour shortage in 2007.

Human pickers give inconsistent results with direct consequences for profitability (e.g. punnets containing strawberries with inconsistent size or shape or showing signs of mishandling would typically be rejected by customers). Farmers use a variety of training and monitoring procedures to increase consistency but these greatly increase cost.

Current technologies for robotic soft fruit harvesting tend to rely on sophisticated hardware and naive robot control systems. In consequence, other soft fruit picking systems have not been commercially successful because they are expensive and require carefully controlled environments.

A small number of groups have developed robotic strawberry harvesting technology. However, the robots often come at a high cost and still need human operators to grade and post-process the fruit. Furthermore, the robots are often not compatible with table top growing systems used in Europe and are too expensive to be competitive with human labour. Expensive hardware and dated object recognition technology are used, and lacked the mechanical flexibility to pick other than carefully positioned, vertically oriented strawberries or have been poorly suited to the problem of picking soft fruits that cannot be handled except by their stalks. No product offering has therefore materialized.

Hence most of the solutions to date fall down in at least two of the following key areas:

They require growers to change their working practices significantly, or don't support the table top growing systems used in Europe.

They rely heavily on human operators. In consequence, they use large machines with disproportionately high production cost per unit picking capacity compared to small, autonomous machines manufactured in larger quantities.

They are too expensive to displace human labour at current prices.

Elsewhere, several academic groups have also applied (mostly quite dated 1980's era) robotics and computer vision technology to more general harvesting applications. However, the resulting systems have been too limited for commercial exploitation.

Farmers need a dependable system for harvesting their crops, on demand, with consistent quality, and at predictable cost. Such a system will allow farmers to buy a high quality, consistent harvesting capacity in advance at a predictable price, thereby reducing their exposure to labour market price fluctuations. The machine will function autonomously: traversing fields, orchard, or polytunnels; identifying and locating produce ready for harvest; picking selected crops; and finally grading, sorting and depositing picked produce into containers suitable for transfer to cold storage.

SUMMARY OF THE INVENTION

A first aspect of the invention is a robotic fruit picking system comprising an autonomous robot that includes the following subsystems:

a positioning subsystem operable to enable autonomous positioning of the robot using a computer implemented guidance system, such as a computer vision guidance system;

at least one picking arm;

at least one picking head, or other type of end effector, mounted on each picking arm to either cut a stem or branch for a specific fruit or bunch of fruits or pluck that fruit or bunch, and then transfer the fruit or bunch;

a computer vision subsystem to analyse images of the fruit to be picked or stored;

a control subsystem that is programmed with or learns picking strategies;

a quality control (QC) subsystem to monitor the quality of fruit that has been picked or could be picked and grade that fruit according to size and/or quality; and a storage subsystem for receiving picked fruit and storing that fruit in containers for storage or transportation, or in punnets for retail.

We use the term 'picking head' to cover any type of end effector; an end effector is the device, or multiple devices at the end of a robotic arm that interacts with the environment—for example, the head or multiple heads that pick the edible and palatable part of the fruit or that grab and cut the stems to fruits.

BRIEF DESCRIPTION OF THE FIGURES

Aspects of the invention will now be described, by way of example(s), with reference to the following Figures, which each show features of the invention.

DETAILED DESCRIPTION

Figure 1:
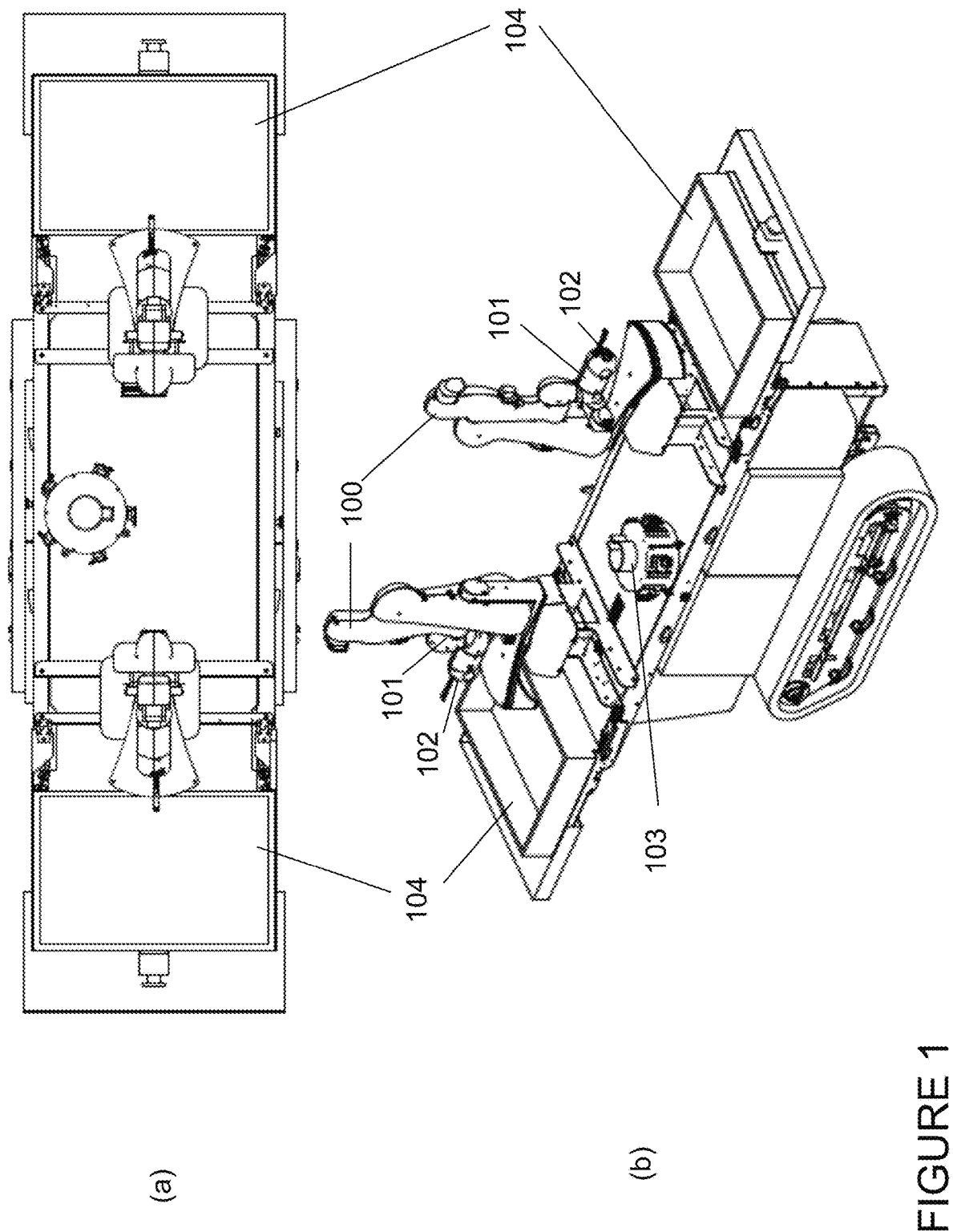
FIG. 1 shows a top view (A) and a perspective view (B) of a robot suitable for fruit picking.

The invention relates to an innovative fruit picking system that uses robotic picking machines capable of both fully autonomous fruit harvesting and working efficiently in concert with human fruit pickers.

Whilst this description focuses on robotic fruit picking systems, the systems and methods described can have a more generalized application in other areas, such as robotic litter picking systems.

The picking system is applicable to a variety of different crops that grow on plants (like strawberries, tomatoes), bushes (like raspberries, blueberries, grapes), and trees (like apples, pears, logan berries). In this document, the term fruit shall include the edible and palatable part of all fruits, vegetables, and other kinds of produce that are picked from plants (including e.g. nuts, seeds, vegetables) and plant shall mean all kinds of fruit producing crop (including plants, bushes, trees). For fruits that grow in clusters or bunches (e.g. grapes, blueberries), fruit may refer to the individual fruit or the whole cluster.

Many plants continue to produce fruit throughout the duration of a long picking season and/or throughout several years of the plant's life. Therefore, a picking robot must not damage either the fruit or the plant on which it grows (including any not-yet-picked fruit, whether ripe or unripe). Damage to the plant/bush/tree might occur either as the robot moves near the plant or during the picking operation.

In contrast to current technologies, our development efforts have been directly informed by the needs of real commercial growers. We will avoid high cost hardware by capitalizing on state-of-the-art computer vision techniques to allow us to use lower cost off-the-shelf components. The appeal of this approach is that the marginal cost of manufacturing software is lower than the marginal cost of manufacturing complex hardware.

An intelligent robot position control system capable of working at high speed without damaging delicate picked fruit has been developed. Whilst typical naive robot control systems are useful for performing repeated tasks in controlled environments (such as car factories), they cannot deal with the variability and uncertainty inherent in tasks like fruit picking. We address this problem using a state-of-the-art reinforcement learning approach that will allow our robot control system to learn more efficient picking strategies using experience gained during picking.

Key components of the fruit picking robot are the following:

A tracked rover capable of navigating autonomously along rows of crops using a vision-based guidance system.

A computer vision system comprising a 3D stereo camera and image processing software for detecting target fruits, and deciding whether to pick them and how to pick them.

A fast, 6 degree-of-freedom robot arm for positioning a picking head and camera.

A picking head, comprising a means of (i) cutting the strawberry stalk and (ii) gripping the cut fruit for transfer.

A quality control subsystem for grading picked strawberries by size and quality.

A packing subsystem for on-board punnetization of picked fruit.

The picking robot performs several functions completely automatically:

loading and unloading itself onto and off of a transport vehicle;
navigating amongst fruit producing plants, e.g. along rows of apple trees or strawberry plants;
collaborating with other robots and human pickers to divide picking work efficiently;
determining the position, orientation, and shape of fruit;
determining whether fruit is suitable for picking;
separating the ripe fruit from the tree;
grading the fruit by size and other measures of suitability;
transferring the picked fruit to a suitable storage container.

The picking system is innovative in several ways. In what follows, some specific non-obvious inventive steps are highlighted with wording like "A useful innovation is . . . ".

1. System Overview

The picking system comprises the following important subsystems:
Total Positioning Subsystem
Picking Arm
Picking Head
Computer Vision Subsystem
Control Subsystem
Quality Control (QC) Subsystem
Storage Subsystem
Mapping Subsystem
Management Subsystem The main purpose of the robot Total Positioning System is physically to move the whole robot along the ground. When the robot is within reach of target fruit, the Picking Arm moves an attached camera to allow the Computer Vision Subsystem to locate target fruits and determine their pose and suitability for picking. The Picking Arm also positions the Picking Head for picking and moves picked fruit to the QC Subsystem (and possibly the Storage Subsystem). The Total Positioning System and the Picking Arm operate under the control of the Control Subsystem, which uses input from the Computer Vision Subsystem to decide where and when to move the robot. The main purpose of the Picking Head is to cut the fruit from the plant and to grip it securely for transfer to the QC and Storage subsystems. Finally, the QC Subsystem is responsible for grading picked fruit, determining its suitability for retail or other use, and discarding unusable fruit.

Figure 2:
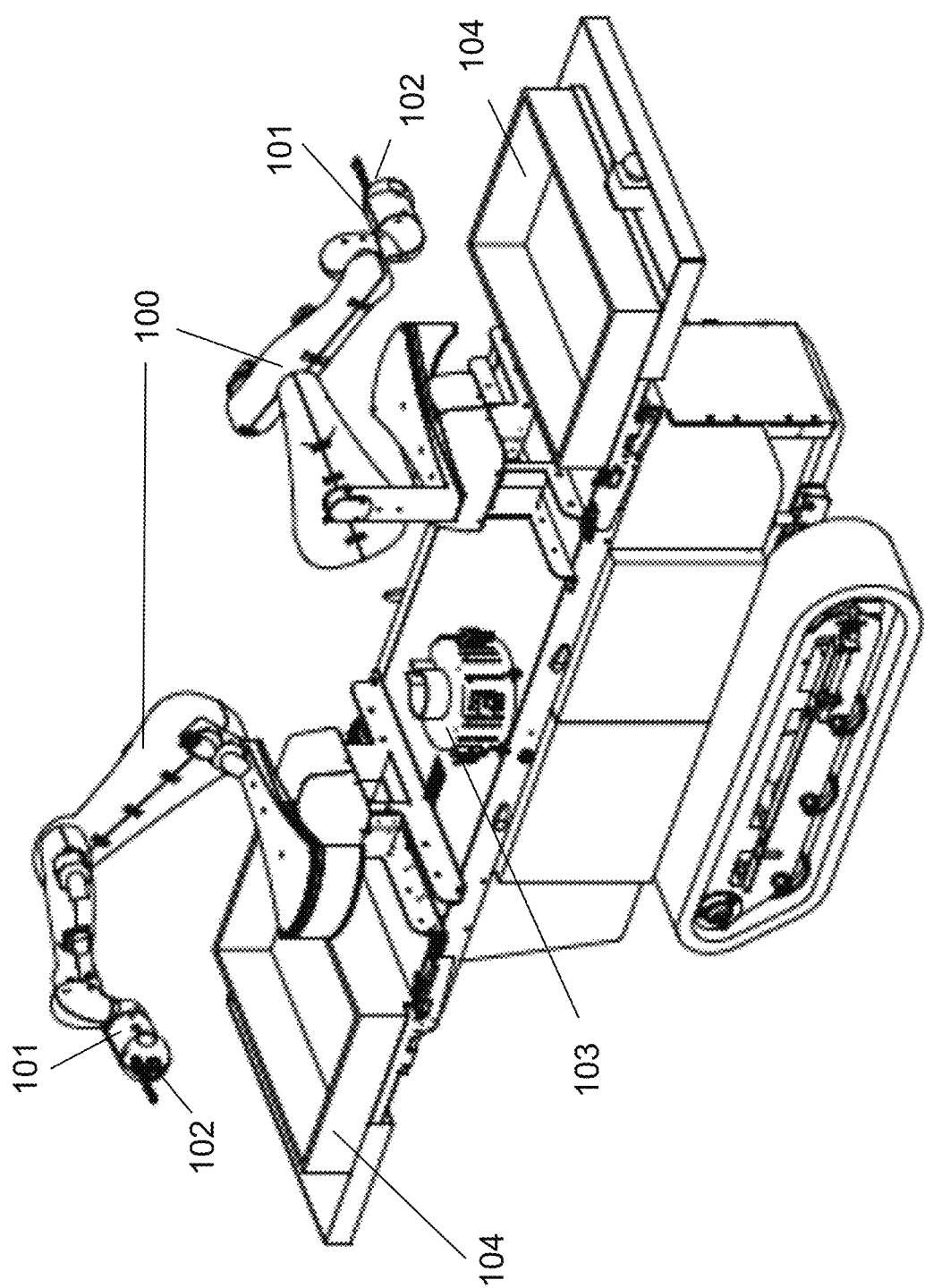
FIG. 2 shows a perspective view of a robot suitable for fruit picking with arms in picking position.

FIG. 1 shows a top view (a) and a perspective view (b) of a robot suitable for fruit picking. The robot includes a Positioning Subsystem operable to enable autonomous positioning of the robot using a computer implemented guidance system, such as a Computer Vision Guidance System. Two Picking Arms (100) are shown for this configuration. A Picking Head (101) is mounted on each Picking Arm (100) to either cut a stem or branch for a specific fruit or bunch of fruits or pluck that fruit or bunch, and then transfer the fruit or bunch. The Picking Head also includes the camera component (102) of the Computer Vision Subsystem, which is responsible for analysing images of the fruit to be picked or stored. A Control Subsystem is programmed with or learns picking strategies. A Quality Control (QC) Subsystem (103) monitors the quality of fruit that has been picked or could be picked and grade that fruit according to size and/or quality and a Storage Subsystem (104) receives the picked fruit and stores that fruit in containers for storage or transportation, or in punnets for retail. FIG. 2 shows a perspective view of the robot with arms in picking position.

Figure 3:
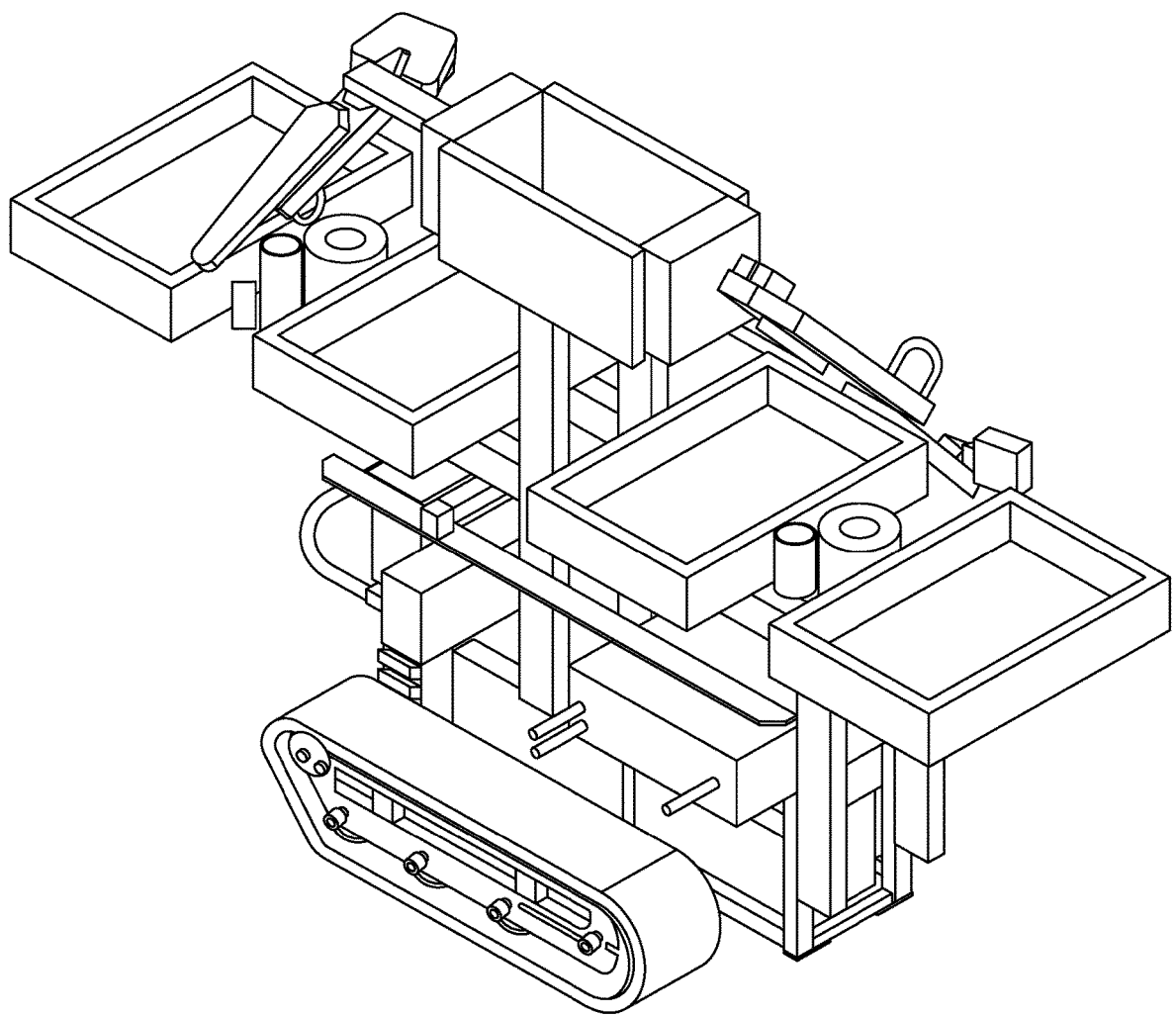
FIG. 3 shows an example of a robot suitable for fruit picking.
Figure 4:
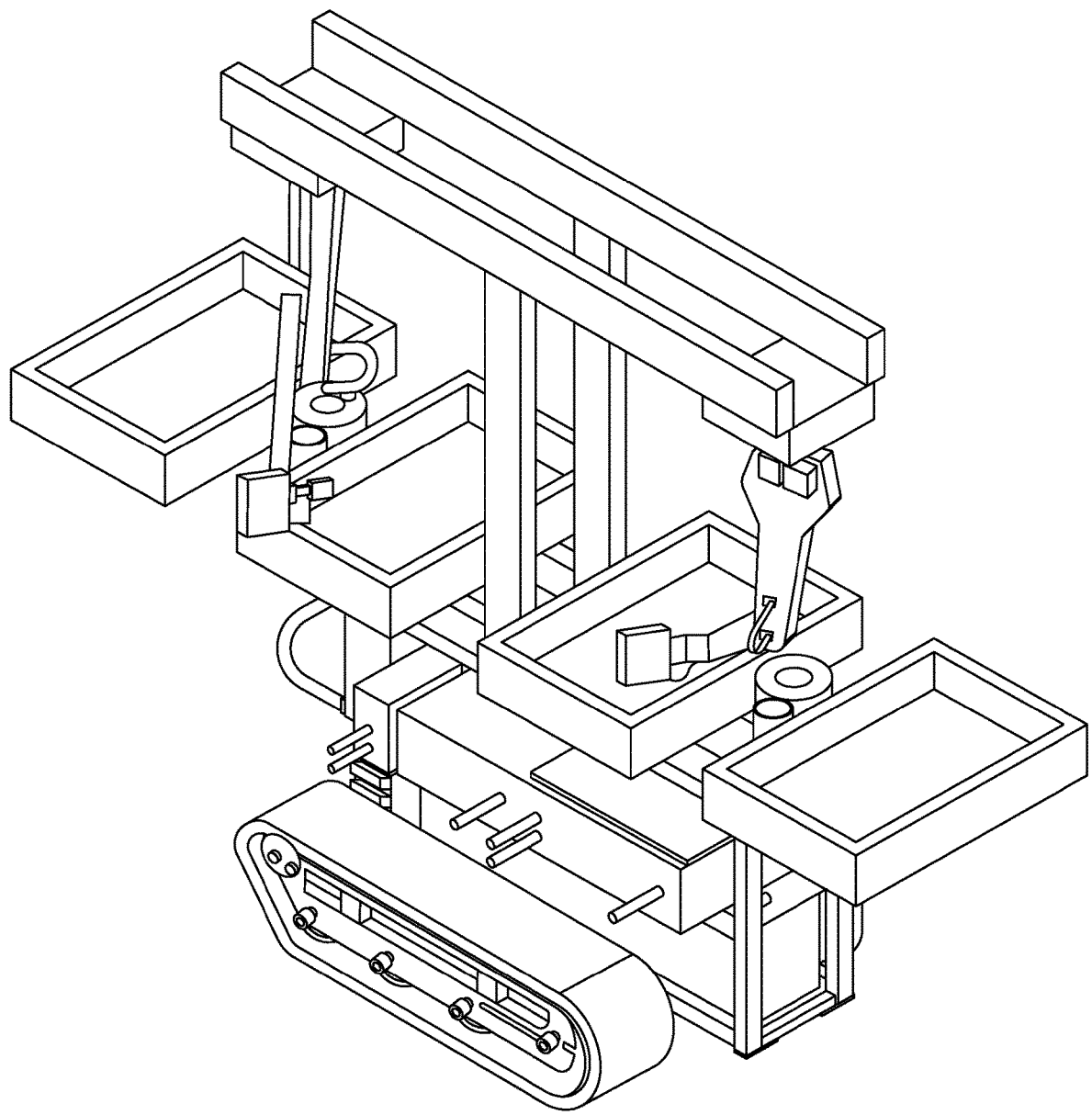
FIG. 4 shows another example of a robot suitable for fruit picking.
Figure 5:
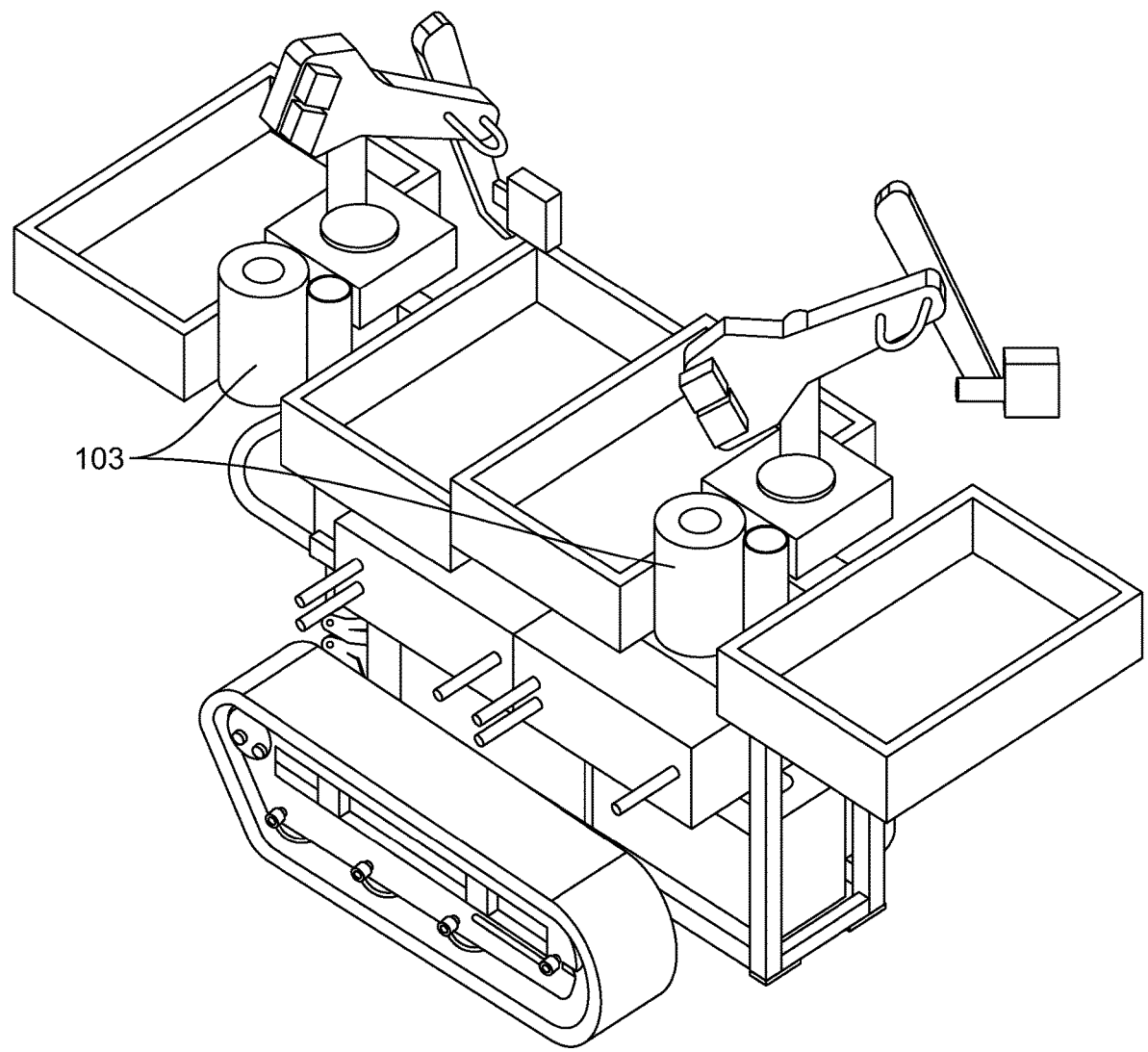
FIG. 5 shows another example of a robot suitable for fruit picking.

FIGS. 3-5 show examples of a robot suitable for fruit picking. Three different conceptual illustrations show the robot configured in several different ways, suitable for different picking applications. Important system components shown include the tracked rover, two Picking Arms, and associated Quality Control units (QC). Multiple trays are used to store punnets of picked fruit and are positioned so that a human operator can easily remove full trays and replace them with empty trays. A discard shoot is positioned adjacent to the Quality Control units for fruit not suitable for sale. When the robot picks rotten or otherwise unsuitable fruit (either by accident or design), it is usually desirable to discard the rotten fruit into a suitable container within the robot or onto the ground. A useful time-saving innovation is to make the container accessible via a discard chute with its aperture positioned at the bottom of the QC rig so that the arm can drop the fruit immediately without the need to move to an alternative container. A related innovation is to induce positive or negative air pressure in the chute or the body of the imaging chamber (e.g. using a fan) to ensure that fungal spores coming from previously discarded fruit are kept away from healthy fruit in the imaging chamber. The two Picking Arms can be positioned asymmetrically (as shown in FIG. 5) to increase reach at the expense of picking speed.

Figure 6:
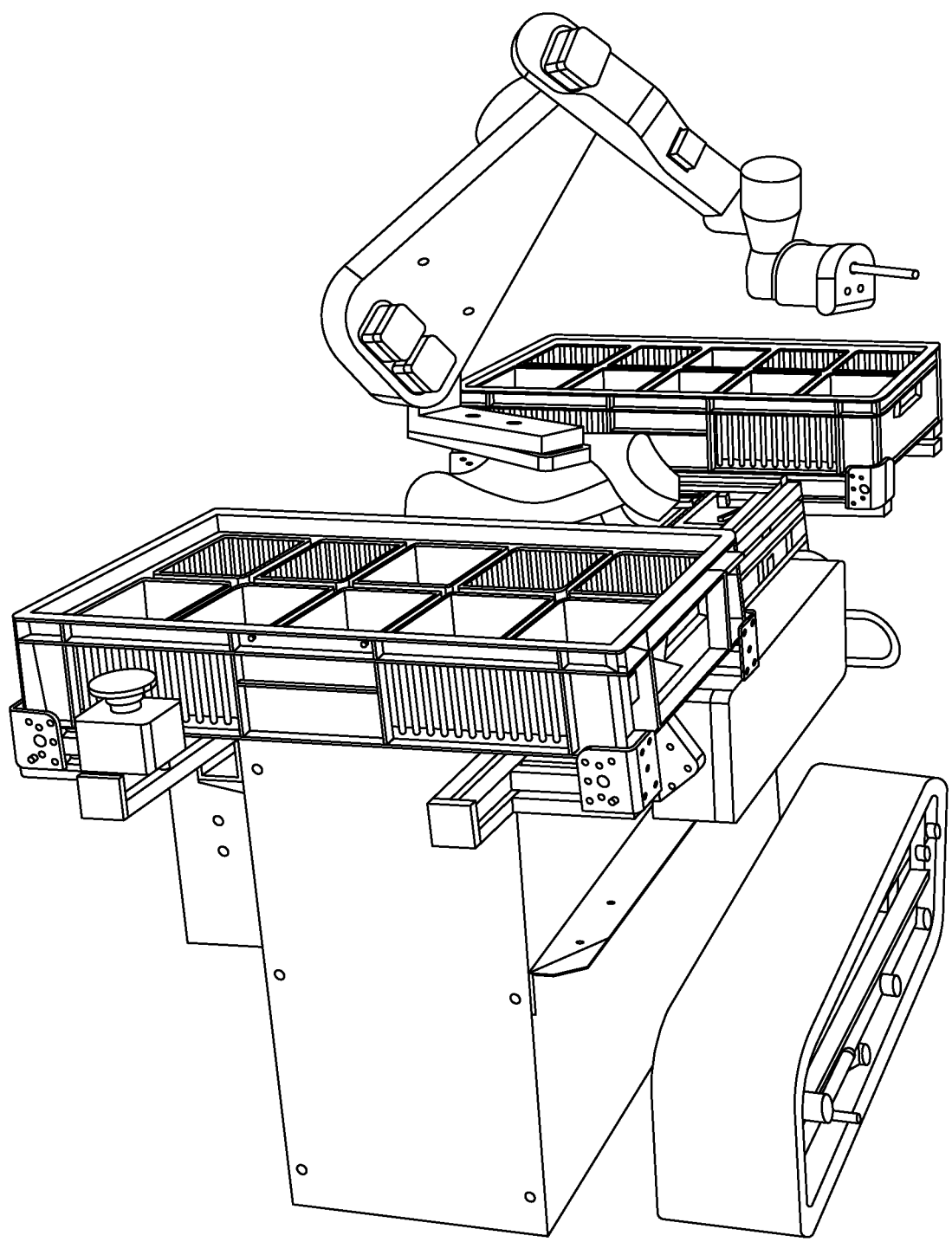
FIG. 6 shows an early embodiment of the invention designed for picking tabletop-grown strawberries.

FIG. 6 shows an early embodiment of the invention designed for picking tabletop-grown strawberries and having a single Picking Arm and two storage trays.

These subsystems will be described in more detail in the following sections.

2. Total Positioning Subsystem

The Total Positioning Subsystem is responsible for movement of the whole robot across the ground (typically in an intendedly straight line between a current position and an input target position). The Total Positioning Subsystem is used by the Management Subsystem to move the robot around. The Total Positioning System comprises a means of determining the present position and orientation of the robot, a means of effecting the motion of the robot along the ground, and a control system that translates information about the current position and orientation of the robot into motor control signals.

21. Pose Determination Component

The purpose of the pose determination component is to allow the robot to determine its current position and orientation in a map coordinate system for input to the Control Component. Coarse position estimates may be obtained using differential GPS but these are insufficiently accurate for following rows of crops without collision. Therefore, a combination of additional sensors is used for more precise determination of heading along the row and lateral distance from the row. The combination may include ultrasound sensors for approximate determination of distance from the row, a magnetic compass for determining heading, accelerometers, and a forwards or backwards facing camera for determining orientation with respect to the crop rows. Information from the sensors is fused with information from the GPS positioning system to obtain a more accurate estimate than could be obtained by either GPS or the sensors individually.

An innovative means of allowing the robot to estimate its position and orientation with respect to a crop row is to measure its displacement relative to a tensioned cable (perhaps of nylon or other low cost material) that runs along the row (a 'vector cable').

One innovative means of measuring the displacement of the robot relative to the vector cable is to use a computer vision system to measure the projected position of the cable in 2D images obtained by a camera mounted with known position and orientation in the robot coordinate system. As a simplistic illustration, the orientation of a horizontal cable in an image obtained by a vertically oriented camera has a simple linear relationship with the orientation of the robot. In general, the edges of the cable will project to a pair of lines in the image, which can be found easily by standard image processing techniques, e.g. by applying an edge detector and computing a Hough transform to find long straight edges. The image position of these lines is a function of the diameter of the cable, the pose of the camera relative to the cable, and the camera's intrinsic parameters (which may be determined in advance). The pose of the camera relative to the cable may then be determined using standard optimization techniques and an initialization provided by the assumption that the robot is approximately aligned with the row. A remaining one-parameter ambiguity (corresponding to rotation of the camera about the axis of the cable) may be eliminated knowing the approximate height of the camera above the ground.

Another innovative approach to determining position relative to the vector cable is to use a follower arm (or follower arms). This is connected at one end to the robot chassis by means of a hinged joint and at the other to a truck that runs along the cable. The angle at the hinged joint (which can be measured e.g. using the resistance of a potentiometer that rotates with the hinge) can be used to determine the displacement relative to the cable. Two follower arms (e.g. one at the front and one at the back) is sufficient to determine displacement and orientation.

Figure 7:
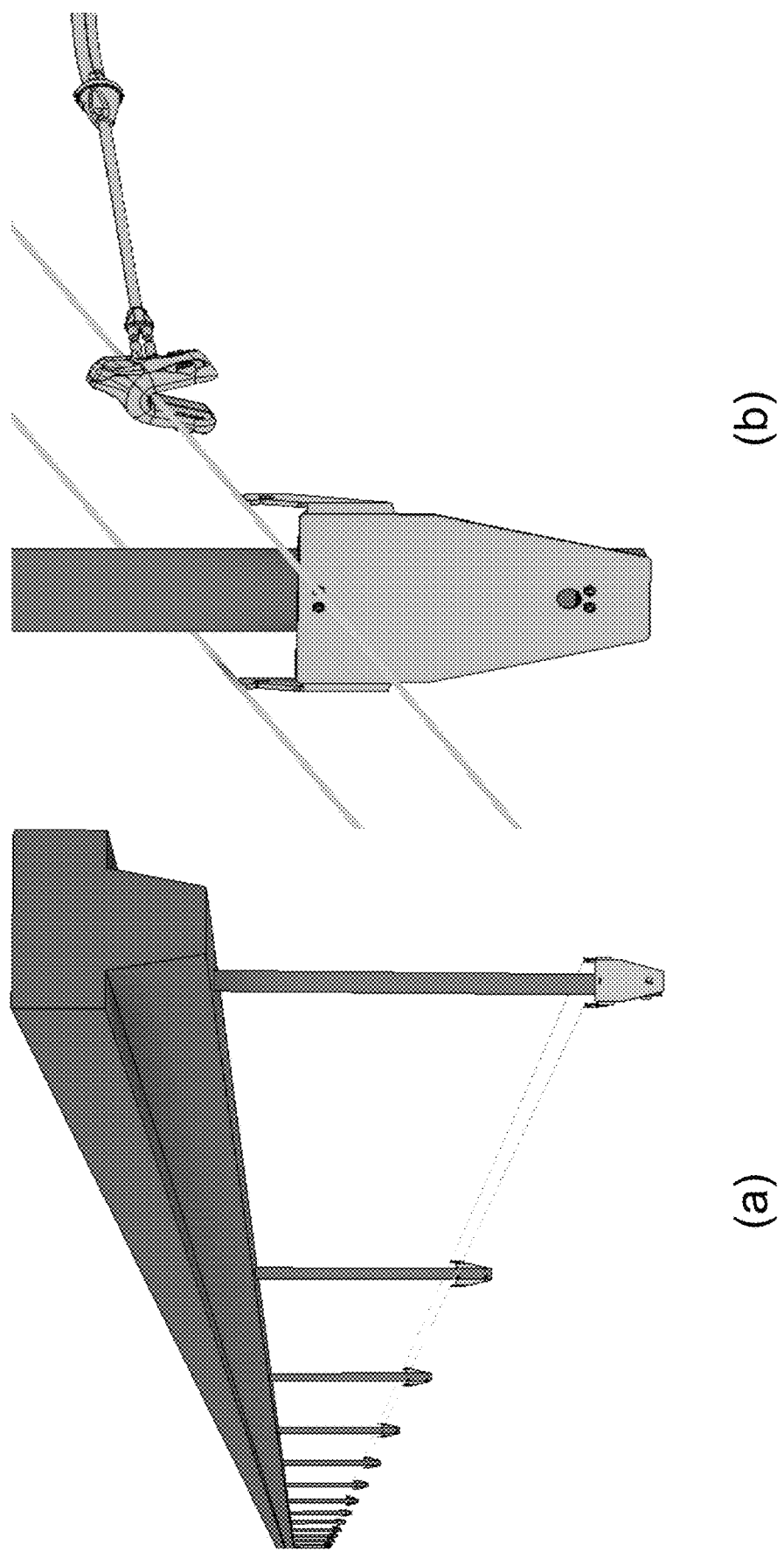
FIG. 7 shows a system for mounting a 'vector cable' to the legs of the tables on which crops are grown using metal brackets that simply clip to the legs.

A related innovation is a bracket that allows vector cables to be attached easily to the legs of the tables on which crops such as strawberries are commonly grown. This is illustrated in FIG. 7. The brackets allow the cable to be positioned a small and consistent distance above the ground, typically 20 cm, so that is easy for humans to step over it whilst ducking underneath elevated tables to move from row to row. One limitation of this approach is that the robot may receive spurious position information if the follower arm falls off the cable. Therefore, a useful additional innovation is to equip the truck with a microswitch positioned so as to break an electrical circuit when the truck loses contact with the cable. This can be used to allow the control software to detect this failure condition and stop the robot (typically, the control software waits until the duration of detected loss of contact between the truck and the cable is greater than some time threshold to eliminate false detections due to bouncing of the truck on the cable). Since the follower arm might be subjected to significant forces in the event of collision or other kind of failure of control system failure, another useful innovation is to use a magnetic coupling to attach an outer portion of the follower arm to an inner portion. Then in the event of failure the parts of the follower arm can separate without suffering permanent damage. The magnetic coupling can include electrical connections required to complete an electrical circuit (typically the same circuit that is interrupted by a microswitch in the truck). By this means separation of the follower arm can also trigger the control software to stop the robot. Another benefit of the magnetic coupling arranging is ease of attachment of the follower arm by a human supervisor.

An innovative aspect of the pose determination component is a computer vision based system for determining the heading and lateral position of a robot with respect to a row of crops using images obtained by a forwards or backwards facing camera pointing approximately along the row. Such a system can be used to drive the robot in the middle of two crop rows or at a fixed distance from a single crop row. In one embodiment of this idea, this is achieved by training a regression function implemented using a convolutional neural network (or otherwise) to predict robot heading and lateral position with respect to rows of crops as a function of an input image. Training data may be obtained by driving a robot equipped with multiple forwards and/or backwards facing cameras between representative crop rows under human remote control. Because the human controller keeps the robot approximately centred between the rows (with heading parallel to the rows), each frame can be associated with approximate ground truth heading and lateral displacement information. Multiple cameras are used to provide a training images corresponding to different approximate lateral displacements from the row. Training images corresponding to different robot headings can be obtained by resampling images obtained by a forwards looking camera using an appropriate 3-by-3 homography (which can be computed trivially from known camera intrinsic calibration parameters).

A related innovation is to obtain additional training image data at night using an infrared illuminator and suitable infrared receptive cameras.

In another embodiment of this idea, a computer vision system is designed to detect (in images obtained by a forwards or backwards facing camera) the vertical legs of the tables on which crops are grown. Vertically oriented table legs define vertical lines in the world, which project to lines in the perspective view. Under the assumption that the legs of each table are evenly spaced, vertically oriented, and arranged in a straight line, projected image lines corresponding to a sequence of three or more table legs are sufficient to determine the orientation of a calibrated camera and its lateral displacement with respect to a 3D coordinate system defined by the legs.

FIG. 7 shows a system for mounting a 'vector cable' to the legs of the tables on which crops are grown (a) using metal brackets (b) that simply clip to the legs. The cable (e.g. a nylon rope) may be secured to the metal brackets using n-shaped metal spring clips or tape (not shown). The row follower arm (seen in b) comprises a truck that rests on the cable and an arm that attaches the truck to the robot (not shown). The brackets are shaped such that the truck is not impeded as it traverses them.

2.2 Motor Control Component

The purpose of the motor control component is to map pose information provided by the pose determination component to motor control signals to move the robot in a given direction. It supports two kinds of motion: (i) moving a given distance along a row of plants and (ii) moving to a given point by travelling in an intendedly straight line. The motor control system uses a PID controller to map control inputs obtained from the pose determination component to motor control signals.

2.3. Rover

An important component of the Total Positioning System is the rover, the means by which the robot moves over the ground. Typically, movement over the ground is achieved using powered wheels with tracks. A useful innovation is a mechanism to allow the tracks to be removed so that the robot can also run on rails.

3. Picking Arm

The Picking Arm is a robot arm with several (typically 6) degrees of freedom that is mounted to the main body of the robot. Whereas the purpose of the Total Positioning System is to move the whole robot along the ground, the purpose of the Picking Arm is to move the Picking Head (and its computer vision camera) to appropriate positions for locating, localizing, and picking target fruit. Once it is in the picking position, the Picking Head executes a picking routine that comprises a sequence of mechanical actions including separation, gripping, and cutting (see the Picking Head description below). Picking positions are chosen by the Control Subsystem to maximize picking performance according to a desired metric.

Before the Picking Head can be positioned to pick a target fruit the Computer Vision Subsystem must carry out several important operations: (i) detecting the target fruit, (ii) detecting obstructions that might complicate picking of the target fruit (e.g. leaves), (iii) determining the pose and shape of the target fruit. So that the Computer Vision Subsystem can perform these functions, the Picking Arm may be equipped with a monocular or stereo camera, mounted e.g. to the end of the arm. The benefit of having a camera mounted to the arm is the possibility of moving the camera to find viewpoints free from sources of occlusion that would otherwise prevent reliable detection or localization of the target fruit (leaves, other fruits, etc.).

Finally, the Picking Arm must move the Picking Head to an appropriate pose for picking without colliding with the plant, or the support infrastructure used to grow the plant, or itself. This is achieved using a route-planning algorithm described in the Control Subsystem section below.

Figure 8:
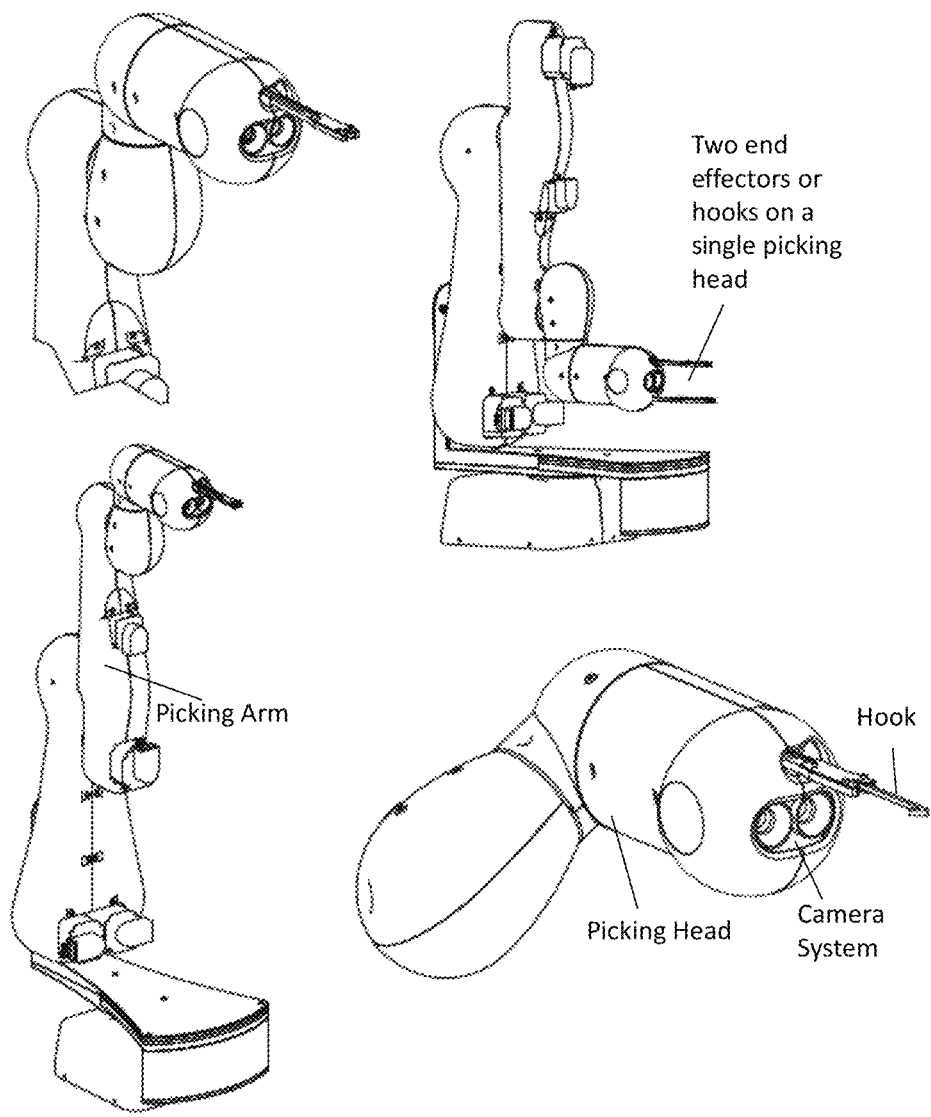
FIG. 8 shows a number of line drawings with different views of the picking arm and picking head alone or in combination.

FIG. 8 shows a number of line drawings with different views of the Picking Arm and Picking Head alone or in combination. The Picking Head shown includes a hook and camera system.

4. Picking Head

The purpose of the Picking Head is to sever the target fruit from the plant, to grasp it securely while it is moved to the QC and Storage Subsystems, and to release it. A secondary purpose is to move leaves and other sources of occlusion out of the way so fruit can be detected and localized, and to separate target fruit from the plant (before it is permanently severed) to facilitate determination of picking suitability.

Picking soft fruits like strawberries is challenging because physical handling of the fruit can cause bruising, reducing saleability. Therefore, such fruits are ideally picked by severing the stem without handling the body of the fruit. An inventive aspect of our system is the use of a stem-severing Picking Head that works in three phases ('grab-grip-cuf'):

1. Physical separation of the fruit from the remainder of the plant ('grab'). In advance of permanently severing the fruit from the plant, this step facilitates (i) deciding whether or not the fruit is suitable for picking and (ii) increases the chances that picking in step 2 will proceed successfully without damage to the target fruit of the rest of the plant.
2. Gripping of the picked fruit by its stem ('grip').
3. Severing the stem (above the point at which it is gripped) so as permanently to separate the fruit from the plant ('cut').

The introduction of the physical separation phase (which take place before the fruit is permanently severed from the plant) confers several benefits. Since target fruit may be occluded by leaves or other fruit, pulling it further away from the plan facilitates a better view, allowing the computer vision system to determine more reliably whether the fruit is ready for picking and whether the picking procedure is likely to be successful (for example because other fruits are in the target vicinity). A related innovation is a mechanical gripper that can rotate the gripped fruit during this before-picking inspection phase, e.g. by applying a twisting force to its stalk or otherwise. By this means, a camera or other sensors can obtain information about parts of the fruit that would not otherwise have been visible. One benefit of this innovation it the possibility of deciding to postpone picking a fruit that appears unripe on the once-hidden side.

A possible further innovation is to combine the grip and cut phases (2 and 3) by means of exploiting the gripping action to pull the stem against a cutting blade or blades.

Appendix A describes several innovative mechanical Picking Head designs embodying some of these ideas.

For some soft fruits such as raspberries, it is necessary to remove the fruit from its stem during picking. For such fruits, a useful innovation is to pick the fruit by first severing and gripping its stem and then to remove the body of the fruit from its stem in a subsequent operation. Compared to picking techniques that require holding or gripping the body of the fruit, important benefits if this approach include: (i) minimizing handling of the body of the fruit (which can significantly reduce shelf life, e.g. due to the transference of disease-causing pathogens from fruit to fruit on the surface of the handling device), (ii) the possibility of imaging the body of the picked fruit from all directions for quality control, and (iii) the possibility of removing the stem under controlled conditions.

Various means of removing the picked fruit from the stem are possible. One innovative approach is to pull the fruit from its stem using a jet of compressed air. This allows contact forces to be distributed evenly over a large contact area, minimizing bruising. Another possibility is to pull the fruit by it stem through a collar, shaped to facilitate forcing the body of the fruit off the stem. Depending on the specific type of fruit, collars might be designed to either to distribute the contact force over a large area of the body of the fruit or to concentrate the contact force (possibly via a cutting edge resembling that of a knife of row of needles) in a circular pattern surrounding the stem. A related innovation is to clean the collar after each use or to provide the collar with a disposable surface to reduce the likelihood of transfer of pathogens from fruit to fruit.

Another innovation is to use the inertia of the body of the fruit to separate the body of the fruit from the receptacle. This might be achieved by holding the fruit by its stalk and rotating it about an axis perpendicular to its stalk at a high enough angular velocity. The advantage of this approach is that inertial forces effectively act over the entire mass of the body of the fruit, eliminating the need for contact forces at the surface (more likely to cause bruising because they are applied over a small contact area, increasing localized pressure). One limitation of this approach is that, when the body of the fruit separates from the receptacle, it will fly off at speed on a tangent to the circle of rotation, necessitating some means of arresting its motion sufficiently slowly that it doesn't suffer bruising. Therefore, another innovation is to use a reciprocating back-and-forth motion of the fruit or its stalk in the direction approximately perpendicular to the stalk or an oscillatory rotary motion with an axis of rotation approximately parallel to the stalk. By performing the motion at an appropriate frequency and with appropriate amplitude it is possible reliably to separate the body of the fruit from the husk without causing it to fly off at high velocity.

After picking, the Picking Head grips the fruit as it transferred by the Picking Arm to the Quality Control (QC) Subsystem. In a simple embodiment, the Picking Arm itself might be used to position the picked fruit inside the imaging component of the QC Subsystem before subsequently moving the fruit to the storage. However, time spent transferring picked fruit to the QC/Storage Subsystem is unproductive because the arm is not being used for picking during the transfer. Therefore, a useful innovation is to include multiple picking units on a single multiplexed Picking Head. This means that several fruits in a particular local vicinity can be picked in succession before the arm has to perform the time-consuming movement between the plant and the QC/Storage components and back. This means that the transfer overhead can be amortized over more picked fruits, increasing productivity. This is particularly advantageous in the common case that fruit are bunched on the plant/tree such the robot arm needs to move only a small distance to pick several targets before transfer.

Picking units on the multiplexed Picking Head must be arranged so that inactive picking units do not interfere with the operation of active picking units, or collide with the arm, or other objects. Innovative ways of achieving this include: mounting the picking units radially about an axis chosen so that inactive picking units are oriented away from the active picking unit and the fruit being picked.
making each picking unit extend independently so it can engage with the fruit while others do not disturb the scene.

Picking units typically have several moving parts e.g. for hooking, cutting, etc., which may need to be driven independently. However, when multiplexing multiple units on a single Picking Head, if each moving part is driven with its own actuator, the arm payload increases proportionally to the number of picking units, which would adversely affect arm speed, accuracy, and the overall cost of the machine. Several innovative aspects of the implementation of the multiplexed Picking Head keep the overall mass of the multiplexed Picking Head low to allow the arm to move quickly and accurately:
Multiple picking functions on a picking unit can be driven by a single actuator or motor, selectively engaged by lightweight means, for example electromagnets; an engaging pin; rotary tab; or similar. This is challenging as the different functions may require different actuator characteristics.
A single motor or actuator can drive one function across all units on the head, selectively engaged by means of an electromagnet; an engaging pin; rotary tab; or similar. This is reasonably straightforward.
The functions can be driven by lightweight means from elsewhere in the system, for example using a Bowden cable, torsional drive cable/spring, pneumatic or hydraulic means.
5. Computer Vision Subsystem The purpose of the Computer Vision Subsystem is to locate target fruits, determine their pose in a robot coordinate system, and determine whether they are suitable for picking, i.e. before the fruit is permanently separated from the plant.

To achieve this, the Computer Vision Subsystem uses one or more cameras mounted to the end of the movable Picking Arm (or in general to any other part of the robot such as the chassis). The camera attached to the robot arm is moved under computer control to facilitate the detection of target fruits, estimation of their pose (i.e. position and orientation), and determination of their likely suitability for picking. Pose estimates and picking suitability indicators associated with each target fruit may be refined progressively as the arm moves. However, this refinement stage takes time, which increases the time required for picking. Therefore, an important innovation is a scheme for moving the arm efficiently to optimize trade-off between picking speed and picking accuracy (this scheme is described in more detail in the Robot Control Subsystem section, below).

The Computer Vision Subsystem operates under the control of the Robot Control Subsystem, which makes a continuous sequence of decisions about which action to perform next, e.g. moving the arm-mounted camera to new viewpoints to facilitate discovery of more target fruits, or moving the camera to new points in the local vicinity of a target fruit so as to refine estimates of its position/orientation or indicators of picking suitability.

In outline, the Computer Vision Subsystem works as follows:
1. Under the control of the Robot Control Subsystem, the camera captures images of the scene from multiple viewpoints.
2. Target fruits are detected in the captured images by pixel-wise semantic segmentation.
3. Approximate estimates of pose and shape are recovered for each detected fruit.
4. More accurate estimates of pose and shape are recovered by combining information in multiple views with statistical prior knowledge. This is achieved by adapting the parameters of a generative model of strawberry appearance to maximize agreement between the predictions and the images.
5. Picking success probability for each detected fruit is estimated from visual and geometric cues.
6. Under the control of the Control Subsystem, additional images of a particular target fruit may be captured from new viewpoints so as to increase picking success probability.

The important steps are described in more detail below.

Image capture. An important challenge is to control the exposure of the camera system to obtain images that are consistently correctly exposed. Failure to do this increases the amount of variability in the images, compromising the ability of the machine-learning-based target detection software to detect fruit accurately and reliably. One exposure control strategy is to obtain an image of a grey card exposed to ambient lighting conditions. This image is then analysed to determine the adjustments to exposure time and/or colour channel gains required to ensure that the grey card appears with a predetermined target colour value. A grey card might be positioned on the robot chassis with reach of the Picking Arms and oriented horizontally to measure ambient illumination arriving from the approximate direction of the sky. However, a potential limitation of this approach is that the illumination of the grey card may not be representative of the illumination of the plant or target fruit. Therefore, in a system where a (stereo) camera is incorporated within the Picking Head, a useful innovation is to arrange that a part of the Picking Head itself can be used as an exposure control target. A prerequisite is that the exposure control target must appear within the field of view of the camera. A suitable target could be a grey card imaged from in front or a translucent plastic diffuser imaged from underneath.

Real world lighting conditions can compromise image quality, limiting the effectiveness of image processing operations such as target fruit detection. For example, images obtained by a camera oriented directly towards the sun on a cloudless day may exhibit lens flare. Therefore, a useful innovation is to have control system software use the weather forecast to schedule picking operations so that the robot's camera systems are oriented to maximize the quality of the image data being obtained as a function of expected lighting conditions over a given period. For example, on a day that is forecast to be sunny in a farm where fruit is grown in rows, the robot might pick on one side of the rows in the morning and the other side of the rows in the afternoon. On a cloudy day, robots might more usefully pick on both sides of the row simultaneously to amortize the cost of advancing the robot along the row over more picked fruit at each position. A related innovation is to adapt viewpoints dynamically as a function of lighting conditions to maximize picking performance. For example, the Picking Head might be angled downwards in conditions of direct sunlight to avoid lens flare even at the expense of a reduction in working volume.

Target detection. Target fruit is detected automatically in images obtained by a camera mounted to the Picking Arm or elsewhere. A machine learning approach is used to train a detection algorithm to identify fruit in RGB colour images (and/or in depth images obtained by dense stereo or otherwise). To provide training data, images obtained from representative viewpoints are annotated manually with the position and/or extent of target fruit. Various embodiments of this idea are possible:

1. A decision forest classifier or convolutional neural network (CNN) may be trained to perform semantic segmentation, i.e. to label pixels corresponding to ripe fruit, unripe fruit, and other objects. Pixel-wise labelling may be noisy, and evidence may be aggregated across multiple pixels by using a clustering algorithm.
2. A CNN can be trained to distinguish image patches that contain a target fruit at their centre from image patches that do not. A sliding window approach may be used to determine the positions of all image patches likely to contain target fruits. Alternatively, the semantic labelling algorithm 1 may be used to identify the likely image locations of target fruits for subsequent more accurate classification by a (typically more computationally expensive) CNN.

Target pose determination. Picking Heads for different types of fruit may work in different ways, e.g. by cutting the stalk or by twisting the fruit until the stalk is severed (see above, and Appendix A). Depending on the Picking Head design, picking a target fruit may necessitate first estimating the position and orientation (or pose) of the fruit or its stalk (in what follows, fruit should be interpreted to mean the body of the fruit or its stalk or both). Rigid body pose in general has 6 degrees of freedom (e.g. the X, Y, Z coordinates of a fruit in a suitable world coordinate system and the three angles describing its orientation relative to the world coordinate system's axes). Pose may be modelled as a 4-by-4 homography that maps homogenous 3D points in a suitable fruit coordinate system into the world coordinate system. The fruit coordinate system can be aligned with fruits of specific types as convenient. For example, the origin of the coordinate system may be located at the point of intersection of the body of the fruit and its stalk and the first axis points in the direction of the stalk. Many types of fruit (such as strawberries and apples) and most kinds of stalk have a shape with an axis of approximate rotational symmetry. This means that 5 degrees of freedom typically provide a sufficiently complete representation of pose for picking purposes, i.e. the second and third axes of the fruit coordinate system can be oriented arbitrarily.

The robot determines the pose of target fruit using images obtained from multiple viewpoints, e.g. using a stereo camera or a monocular camera mounted to the moving Picking Arm. For example, the detected position of a target fruit in two or more calibrated views is sufficient to approximately to determine its X, Y, Z position by triangulation. The orientation of the fruit or its stalk may then be estimated by assumption (e.g. the assumption that fruits hang vertically) or recovered from image data.

A useful innovation is to use a learned regression function to map images of target fruits directly to their orientation in a camera coordinate system. This can be achieved using a machine learning approach whereby a suitable regression model is trained to predict the two angles describing the orientation of an approximately rotationally symmetric fruit from images (including monocular, stereo, and depth images). This approach is effective for fruits such as strawberries that have surface texture that is aligned with the dominant axis of the fruit. Suitable training images may be obtained using a camera mounted to the end of a robot arm. First, the arm is moved manually until the camera is approximately aligned with a suitable fruit-based coordinate system and a fixed distance away from the fruit's centroid. The arm is aligned so the fruit has canonical orientation in a camera image, i.e. so that the two or three angles used to describe orientation in the camera coordinate frame are 0. Then the arm moves automatically to obtain additional training images from new viewpoints with different, known relative orientations of the fruit. Sufficiently high quality training data can be obtained by having a human operator judge alignment between the camera and the fruit coordinate system visually by inspection of the scene and the video signal produced by the camera. Typically training images are cropped so that the centroid of the detected fruit appears in the centre of the frame and scaled so that the fruit occupies constant size. Then a convolutional neural network or other regression model is trained to predict fruit orientation in previously unseen images. Various image features are informative as to the orientation of the fruit in the camera image frame (and can be exploited automatically by a suitable machine learning approach), e.g. the density and orientation of any seeds on the surface of the fruit, the location of the calyx (the leafy part around the stem), and image location of the stalk.

Because knowledge of the orientation of the stalk may be very important for picking some types of fruits (or otherwise informative as to the orientation of the body of the fruit), another useful innovation is a stalk detection algorithm that identifies and delineates stalks in images. A stalk detector can be implemented by training a pixel-wise semantic labelling engine (e.g. a decision forest or CNN) using manually annotated training images to identify pixels that lie on the central axis of a stalk. Then a line growing algorithm can be used to delineate visible portions of stalk. If stereo or depth images are used, then stalk orientation can be determined in a 3D coordinate frame by matching corresponding lines corresponding to a single stalk in two or more frames. Solution dense stereo matching problem is considerably facilitated by conducting semantic segmentation of the scene first (stalks, target fruits). Assumptions about the range of depths likely to be occupied by the stalk can be used to constrain the stereo matching problem.

Given an approximate pose estimate for a target fruit, it may be that obtaining an additional view will improve the pose estimate, for example by revealing an informative part of the fruit such as the point where the stalk attaches. Therefore, a useful innovation is an algorithm for predicting the extent to which additional views out of a set of available viewpoints will most significantly improve the quality of an initial pose estimate. Pose estimates obtained using multiple views and statistical prior knowledge about the likely shape and pose of target fruits can be fused using an innovative model fitting approach (see below).

Size and shape determination and pose estimate refinement. Whether a target fruit is suitable for picking may depend on its shape and size, e.g. because a customer wants fruit with diameter in a specified range. Furthermore, certain parameters of the picking system may need to be tuned considering the shape and size of the fruit, e.g. the trajectory of the Picking Head relative to the fruit during the initial 'grab' phase of the picking motion (see above). Therefore, it may be beneficial to estimate the shape and size of candidate fruits before picking as well as to refine (possibly coarse) pose estimates determined as above. This can be achieved using images of the fruit (including stereo images) obtained from one or more viewpoints.

An innovative approach to recovering the 3D shape of a candidate fruit from one or more images is to adapt the parameters of a generative model of the fruit's image appearance to maximize the agreement between the images and the model's predictions, e.g. by using Gauss-Newton optimization. This approach can also be used to refine a coarse initial estimate of the fruit's position and orientation (provided as described above). A suitable model could take the form of a (possibly textured) triangulated 3D mesh projected into some perspective views. The shape of the 3D mesh could be determined by a mathematical function of some parameters describing the shape of the fruit. A suitable function could be constructed by obtaining 3D models of a large number of fruits, and then using Principal Component Analysis (or other dimensionality reduction strategy) to discover a low-dimensional parameterization of the fruit's geometry. Another simpler but effective approach is to hand craft such a model, for example by assuming that the 3D shape of fruit can be explained as a volume of revolution to which parametric anisotropic scaling has been applied in the plane perpendicular to the axis. A suitable initialization for optimization can be obtained by using the 2D image shape (or the mean 2D image shape of the fruit) to define a volume of revolution. The pose parameters can be initialized using the method described above.

A key benefit of the model fitting approach is the possibility of combining information from several viewpoints simultaneously. Agreement between the real and predicted image might be measured, e.g. using the distance between the real and predicted silhouette or, for a model that includes lighting or texture, as the sum of squared differences between pixel intensity values. A useful innovation is to use the geometric model to predict not only the surface appearance of the fruit but the shadows cast by the fruit onto itself under different, controlled lighting conditions. Controlled lighting can be provided by one or more illuminators attached to the end of the robot arm. Another useful innovation is to model agreement using a composite cost function that comprises terms reflecting agreement both between silhouette and stalk.

Another benefit of the model fitting approach is the possibility of combining image evidence with statistical prior knowledge to obtain a maximum likelihood estimate of shape and pose parameters. Statistical prior knowledge can be incorporated by penalizing unlikely parameter configurations that are unlikely according to a probabilistic model. One valuable innovation is the use for this purpose of a statistical prior that model the way that massive fruits hang from their stalks under the influence of gravity. In a simple embodiment, the prior might reflect our knowledge that fruits (particularly large fruits) tend to hang vertically downwards from their stalks. Such a prior might take the simple form of a probability distribution over fruit orientation. A more complex embodiment might take the form of the joint distribution over the shape and size of the fruit, the pose of the fruit, and the shape of the stalk near the point of attachment to the fruit. Suitable probability distributions are usually formed by making geometric measurements of fruit growing under representative conditions.

Some Picking Head designs make it possible physically to separate a candidate fruit further from the plant and other fruits in the bunch before picking (see above). For example, the 'hook' design of Picking Head (see Appendix A) allows a candidate fruit to be supported by its stalk so that it hangs at a predictable distance from a camera mounted to the robot arm. One benefit of this innovation is the possibility of capturing an image (or stereo image) of the fruit from a controlled viewpoint, thereby facilitating more accurate determination of the size and shape, e.g. via shape from silhouette.

Determination of picking suitability. An attempt to pick a target fruit might or might not be successful. Successful picking usually means that (i) the picked fruit is suitable for sale (e.g. ripe and undamaged) and delivered to the storage container in that condition, (ii) no other part of the plant or growing infrastructure is damaged during picking, and (iii) the Picking Arm does not undergo any collisions that could interfere with its continuing operation. However, in the case of rotten fruits that are picked and discarded to prolong the life of the plant, it is not a requirement that the picked fruit is in saleable condition.

A valuable innovation is to determine the picking suitability of a target fruit by estimating the statistical probability that an attempt to pick it will be successful. This probability can be estimated before attempting to pick a the target fruit via a particular approach trajectory and therefore can be used by the Control Subsystem to decide which fruit to pick next and how to pick it. For example, the fruits that are easiest to pick (i.e. those most likely to be picked successfully) might be picked first to facilitate subsequent picking of fruits that are harder to pick, e.g. because they are partly hidden behind other fruits. The picking success probability estimate can also be used to decide not to pick a particular target fruit, e.g. because the expected cost of picking in terms of damage to the plant or picked fruit will not outweigh the benefit provided by having one more picked fruit. The Control Subsystem is responsible for optimizing picking schedule to achieve the optimal trade-off between picking speed and failure rate (see below).

An important innovation is a scheme for estimating the probability of picking success using images of the scene obtained from viewpoints near the target fruit. For example, we might image the surface of the fruit by moving a camera (possibly a stereo or depth camera) mounted to the Picking Arm's end effector in its local vicinity. Various image measurements might be used as indicators of picking success probability, including e.g. (i) the estimated pose and shape of the fruit and its stalk, (ii) the uncertainty associated with the recovered pose and shape estimates, (iii) the colour of the target fruit's surface, (iv) the proximity of detected obstacles, and (v) the range of viewpoints from which the candidate fruit is visible.

A suitable statistical model for estimating picking success probability might take the form of a multivariate histogram or Gaussian defined on the space of all picking success indicators. An important innovation is to learn and refine the parameters of such a model using picking success data obtained by working robots. Because the Quality Control Subsystem provides accurate judgments about the saleability of picked fruits, its output can be used as an indicator of ground truth picking success or failure. An online learning approach can be used to update the model dynamically as more data are generated to facilitate rapid adaptation of picking behaviour to the requirements of a new farm or phase of the growing season. Multiple robots can share and update the same model.

Since the Picking Head might approach a target fruit via a range of possible trajectories (depending on obstacle geometry and the degrees of freedom of the Picking Arm), the probability of picking success is modelled as a function of hypothesized approach trajectory. By this means, the Control Subsystem can decide how to pick the fruit to achieve the best trade-off between picking time and probability of picking success. The probability of collision between the Picking Arm and the scene can be modelled during the path planning operation using an explicit 3D model of the scene (as described in the Control Subsystem section below). However, an alternative and innovative approach is to use an implicit 3D model of the scene formed by the range of viewpoints from which the target fruit can be observed without occlusion. The underlying insight is that if the target fruit is wholly visible from a particular viewpoint, then the volume defined by the inverse projection of the 2D image perimeter of the fruit must be empty between the camera and the fruit. By identifying one or more viewpoints from which the target fruit appears un-occluded, obstacle free region of space is found. Provided no part of the Picking Head or Arm strays outside of this region of space during picking, there should be no collision. Occlusion of the target fruit by an obstacle between the fruit and the camera when viewed from a particular viewpoint can be detected by several means including e.g. stereo matching.

Another important innovation is a Picking Head that can pull the target fruit away from the plant, to facilitate more reliable determination of the fruit's suitability for picking before the fruit is permanently severed from the plant. Novel Picking Head designs are described in Appendix A.

6. Quality Control Subsystem

The primary function of the Quality Control Subsystem is to assign a measure of quality to individual picked fruits (or possibly individual bunches of picked fruits for fruits that are picked in bunches). Depending on the type of fruit being picked and the intended customer, quality is a function of several properties of the fruit, such as ripeness, colour, hardness, symmetry, size, stem length. Picked fruit may be assigned a grade classification that reflects its quality, e.g. grade 1 (symmetric) or grade 2 (shows significant surface creasing) or grade 3 (very deformed or otherwise unsuitable for sale). Fruit of too low quality for retail sale may be discarded of stored separately for use in other applications, e.g. jam manufacture. An important implementation challenge is to ensure that the QC step can be carried out quickly to maximize the productivity of the picking robot.

A secondary function of the QC Subsystem is to determine a more accurate estimate of the fruit's size and shape. This estimate may be used for several purposes, e.g.
for quality grading, since any asymmetry in the 3D shape for the fruit may be considered reason to assign a lower quality grade;
as a means of estimating the fruit's mass and thereby of ensuring that the require mass of fruit is placed in each punnet according to the requirements of the intended customer for average or minimum mass per punnet;
to facilitate more precise placement of the fruit in the storage container, and therefore to minimize the risk of bruising due to collisions.

The QC Subsystem generates a quality measure for each picked piece of fruit by means of a computer vision component comprising some cameras, some lights, and some software for image capture and analysis. Typically, the cameras are arranged so as to obtain images of the entire surface of a picked fruit that has been suitably positioned, e.g. by the Picking Arm. For example, for fruits like strawberries, which can be held so as to hang vertically downwards from their stalks, one camera might be positioned below the fruit looking upwards and several more cameras might be positioned radially about a vertical axis looking inwards. However, one limitation of this scheme is that a large amount of volume would be required to accommodate cameras (allowing for the camera-object distance, the maximum size of the fruit, and the tolerance inherent in the positioning of the fruit). One solution might be to rotate the fruit in front of a single camera to obtain multiple views—however any undamped motion of the fruit subsequent to rotation might complicate imaging. Therefore, another useful innovation is to use mirrors positioned and oriented so as to provide multiple virtual views of the fruit to a single camera mounted underneath the fruit. This scheme considerably reduces the both the cost and the size of the QC Subsystem. Cameras and/or mirrors are typically arranged so that the fruit appears against a plain background in all views to facilitate segmentation of the fruit in the images.

Another useful innovation is to obtain multiple images under different lighting conditions. For example, this might be achieved by arranging a series of LED lights in a circle around the fruit and activating them one at a time, capturing one exposure per light. This innovation considerably increases the informativeness of the images because directional lights induce shadows both on the surface of the fruit and on a suitability positioned background screen. Such shadows can be used to obtain more information about the 3D shape of the fruit and e.g. the positions of any surface folds that could reduce saleability.

Using these images, image analysis software measures the fruit's 3D shape and detects various kinds of defect (e.g. rot, bird damage, spray residue, bruising, mildew, etc.). A useful first step is a semantic labelling step that is used to segment fruit from background and generate per pixel labels corresponding to the parts of the fruit (e.g. calyx, body, achene, etc.). In the same manner as the Computer Vision Subsystem (which makes crude 3D geometry measurements before picking) 3D geometry can be recovered by the QC Subsystem by adapting the parameters of a generative model to maximize the agreement between the model and the image data. Again, a statistical prior can be used to obtain a maximum likelihood estimate of the values of the shape parameters. A useful innovation is to use an estimate of the mass density of the fruit to determine an estimate of weight from an estimate of volume. By this means, we obviate the need to add the extra complexity of a mechanical weighing device.

Most aspects of quality judgement are somewhat subjective. Whilst human experts can grade picked fruit reasonably consistently, it may be hard for them to articulate exactly what factors give rise to a particular quality label. Therefore, a useful innovation is to use quality labelling data provided by human experts to train a machine learning system to assign quality labels automatically to newly picked fruit. This may be achieved by training an image classifier with training data comprising (i) images of the picked fruit obtained by the QC hardware and (ii) associated quality labels provided by the human expert. A variety of models could be used to map the image data to a quality label such as a simple linear classifier using hand-crafted features appropriate to the type of fruit in question. E.g. in the case of strawberries, appropriate features might be intended to capture information about geometric symmetry, seed density (which can indicate dryness of the fruit), ripeness, and surface folding. With enough training data, it would also be possible to use a convolutional neural network to learn a mapping directly from images to quality labels.

Figure 9:
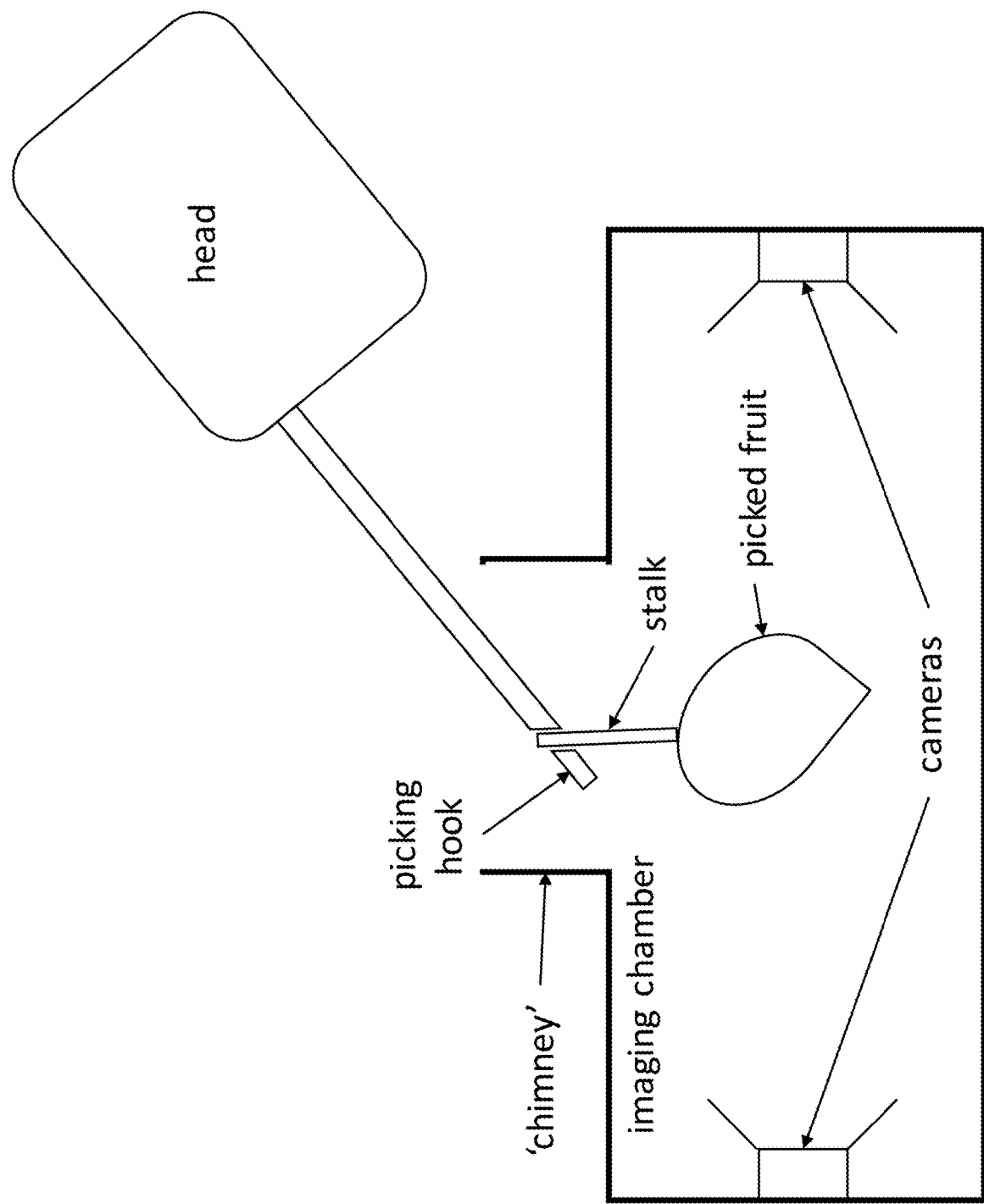
FIG. 9 shows a sectional view of a typical embodiment of a QC imaging chamber.

FIG. 9 shows a sectional view of a typical embodiment of a QC imaging chamber. Cameras (and possibly other sensors, such as cameras sensitive to specific (and possibly non-visible) portions of the EM spectrum including IR, (ii) cameras and illuminators that use polarised light, and (iii) sensors specific to particular chemical compounds that might be emitted by the fruit.) positioned around the walls of the cylindrical imaging chamber provide a view of every part of the surface of the picked fruit. The picked fruit is gripped by a suitable end effector (the one shown here is the hook design described in Appendix A) and lowered into the chamber by the Picking Arm (of which only the head is shown). A useful innovation is to create a 'chimney' to reduce the amount of ambient light entering the QC rig—this is a small cylinder on top of the imaging chamber's aperture that blocks unwanted light from the sides. One difficulty associated with imaging fruit inside the QC imaging chamber is that fruit debris can collect inside the chamber. Therefore a valuable innovation is to equip the chamber with a base that can be pulled out and wiped clean after a period of use.

7. Storage Subsystem

The purpose of the Storage Subsystem is to store picked fruit for transport by the robot until it can be unloaded for subsequent distribution. Because some types of fruit can be damaged by repeated handling, it is often desirable to package the fruit in a manner suitable for retail immediately upon picking. For example, in the case of fruits like strawberries or raspberries, picked fruits are typically transferred directly into the punnets in which they will be shipped to retailers. Typically, punnets are stored in trays, with 10 punnets per tray arranged in a 2-by-5 grid. When all the punnets in each tray are filled, the tray is ready for removal from the robot and replacement with an empty tray.

Since some fruit can be bruised easily by vibration caused by the motion of the robot over the ground, a useful innovation is to mount the trays via a suspension system (active or passive) designed to minimize their acceleration under motion of the robot over rough terrain.

Unloading full trays of picked fruit may necessitate the robot travelling to the end of the row—so it is advantageous for the robot to accommodate more trays to amortize the time cost of travelling to and from the end of the row over more picked fruit. However, it is also advantageous for the robot to be small so that it can manoeuvred and stored easily. Therefore a useful innovation is to equip the robot with tray-supporting shelves that extend outwards at each end but detach or rotate (up or down) out of the way to reduce the robot's length when it needs to be manoeuvred or stored in a confined spaced.

Another useful innovation is to store trays in two vertically oriented stacks inside the body of the robot as illustrated in FIG. 3. One stack contains trays of yet-to-be-filled punnets, the other stack contains trays of full punnets. The Picking Arm transfers picked fruit directly into the topmost trays. Once the punnets in a tray are filled, the stack of full trays descends by one tray depth to accommodate a new a tray, a tray slides horizontally from the top of the stack of yet-to-be-filled trays to the top of the stack of full trays, and the stack of yet-to-be-filled trays ascends by one tray depth to bring a new yet-to-filled tray within reach of the robot arm. This design allows the robot to store multiple trays compactly within a limited footprint—which is important in a robot that must traverse narrow rows of crops or be transported on a transport vehicle.

Refrigerating picked fruits soon after picking may dramatically increase shelf life. One advantage of the compact arrangement of trays described above is that the full trays can be stored in a refrigerated enclosure. In practice however, the power requirements of a refrigeration unit on board the robot may be greater than can be met readily by convenient portable energy sources such as rechargeable batteries. Therefore, another useful innovation is to use one of various means of remote power delivery to the fruit picking robot. One possibility is to use electrified overhead wires or rails like a passenger train. Another is to use an electricity supply cable connected at one end to the robot and at the other to a fixed electrical supply point. The electricity supply cable might be stored in a coil that is wound and unwound automatically as the robot progresses along crop rows and such a coil might be stored on a drum that is located inside the robot or at the end of the crop row. As an alternative to delivering electrical power directly to the robot, a coolant liquid may be circulated between the robot and a static refrigeration unit via flexible pipes. In this case, the robot can use an internal heat exchanger to withdraw heat from the storage container.

Figure 10:
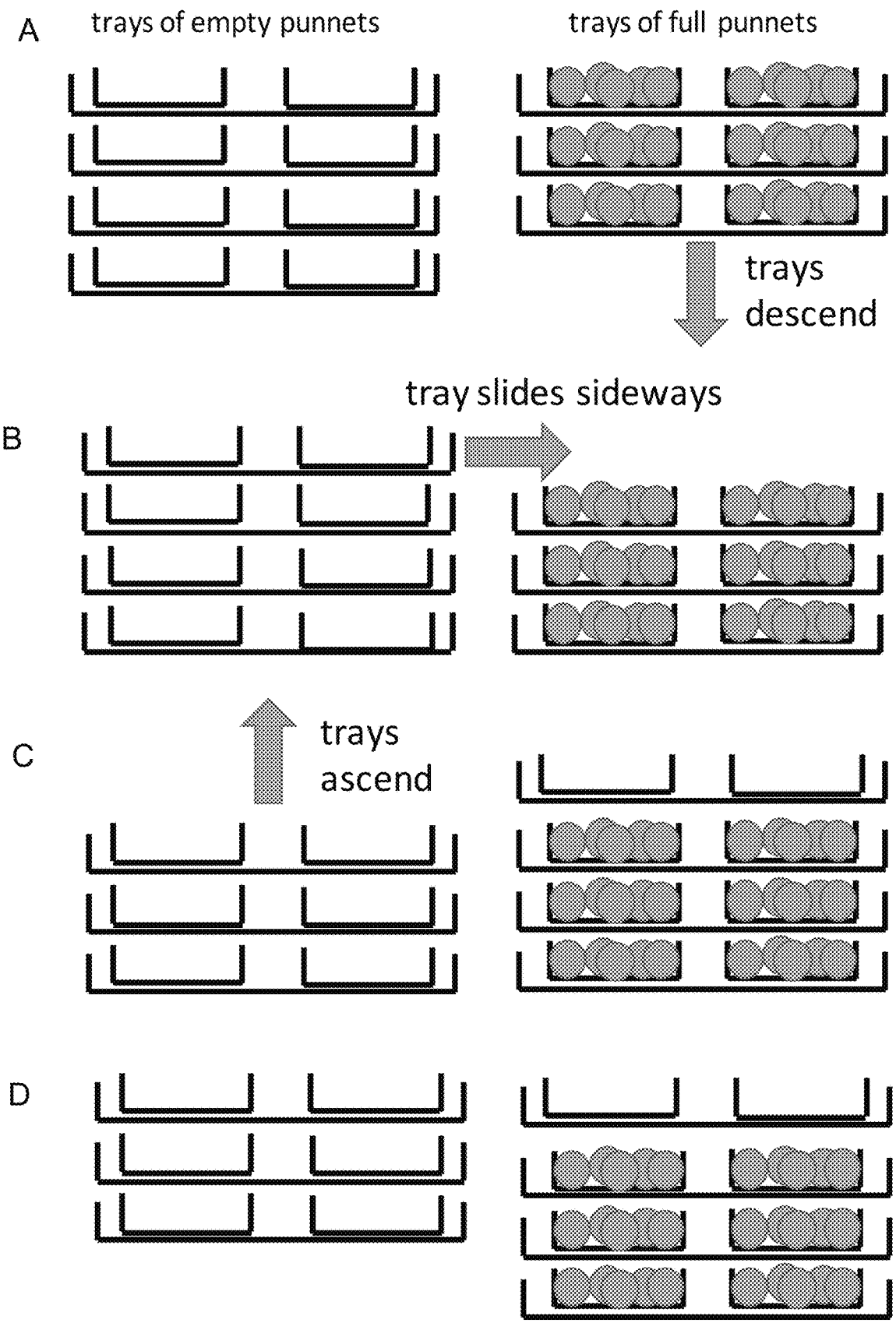
FIG. 10 shows a diagram illustrating a space-saving scheme for storing trays of punnets within a picking robot.
Figure 11:
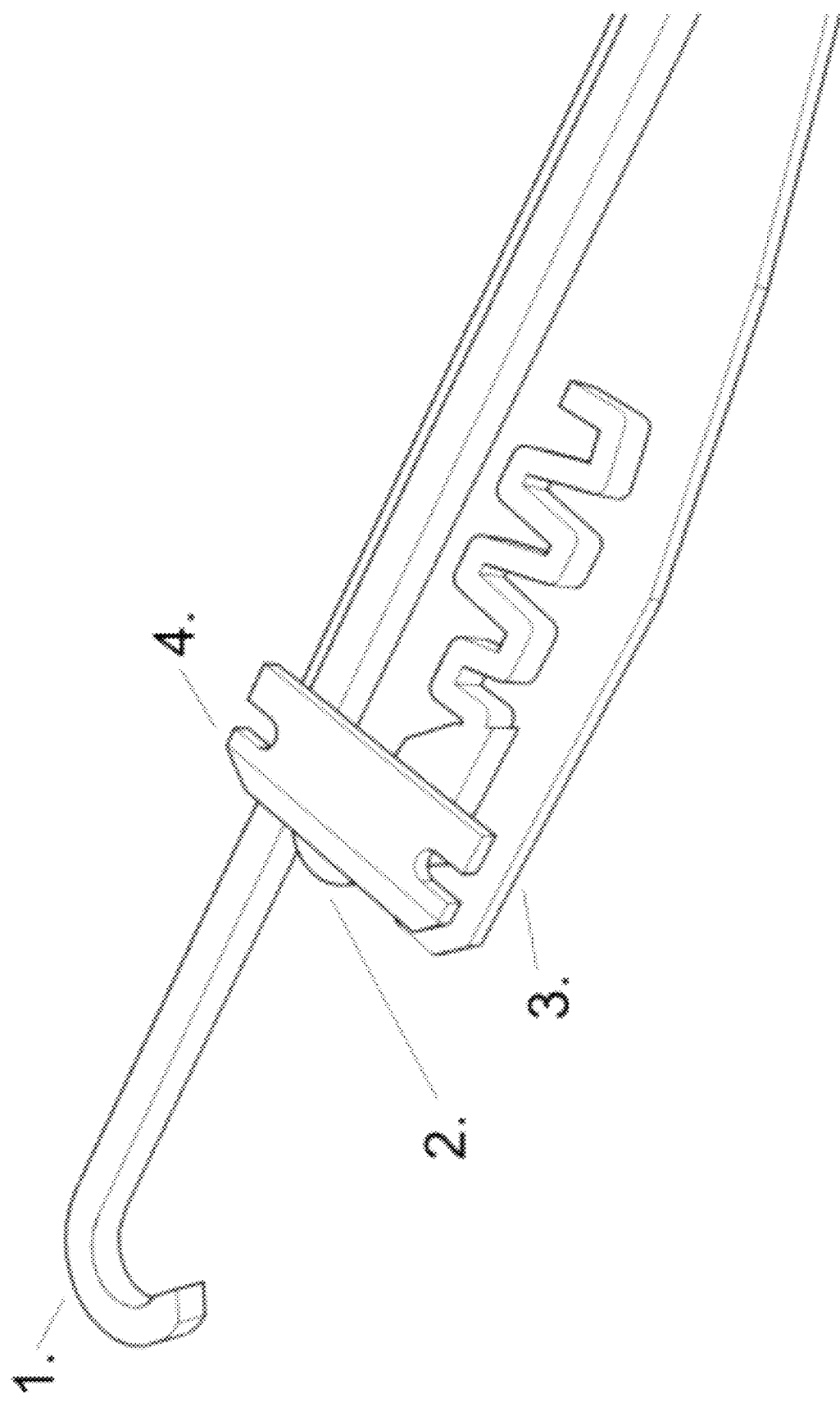
FIG. 11 shows the main components of the end effector.
Figure 12:
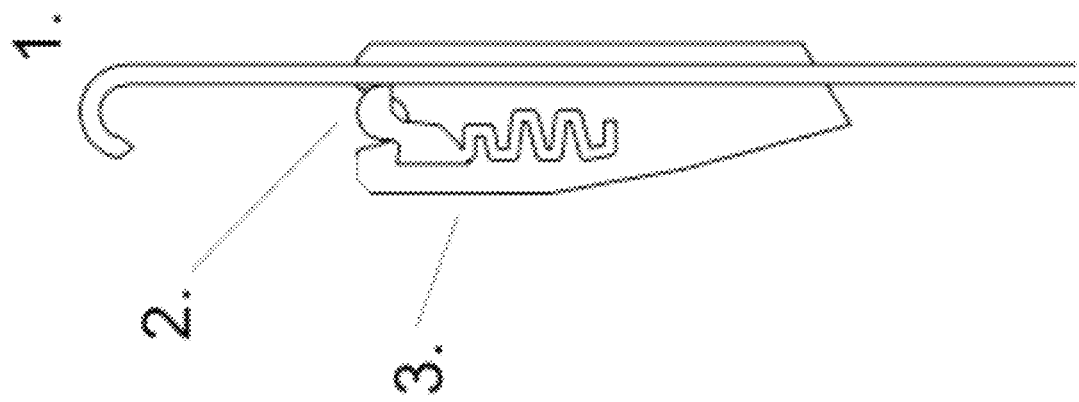
FIG. 12 shows the hook extended relative to the gripper/cutter.
Figure 13:
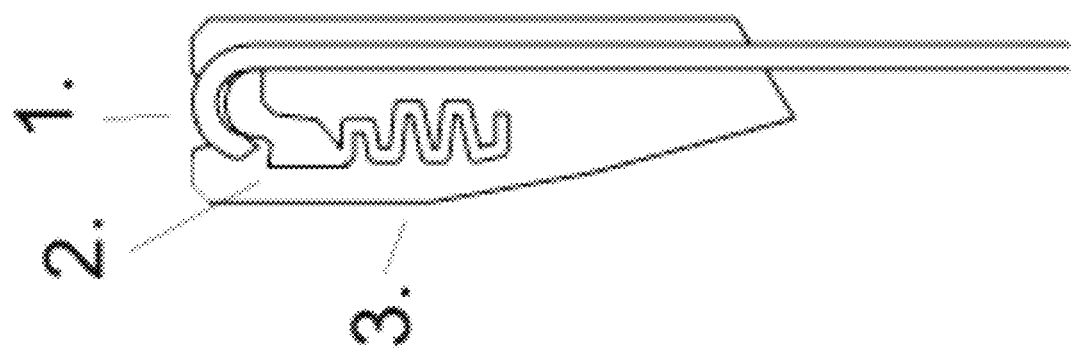
FIG. 13 shows the hook retracted relative to the gripper/cutter.
Figure 14:
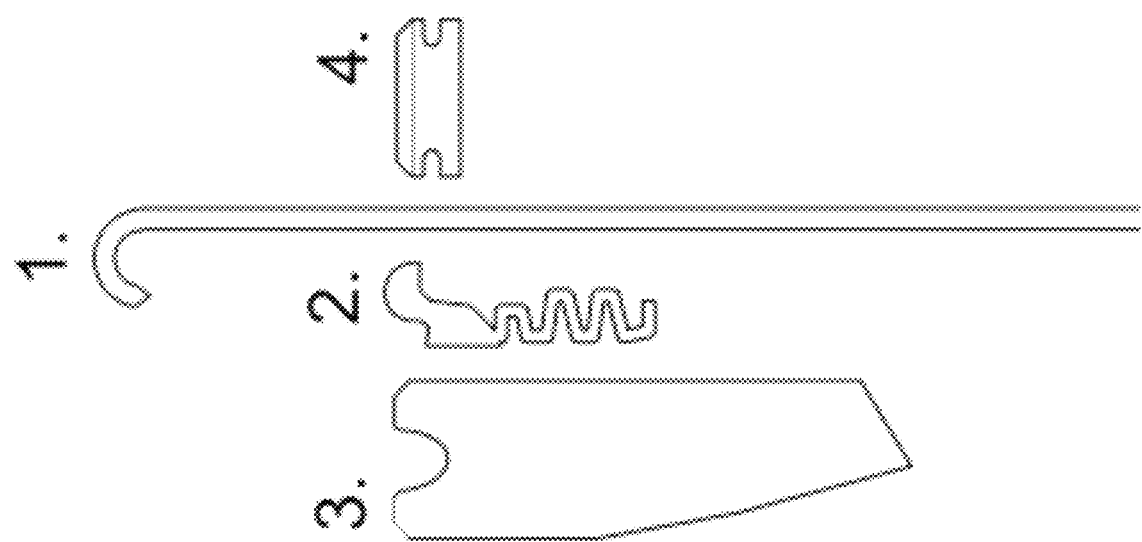
FIG. 14 shows the individual parts of the end effector including the blade above the hook.
Figure 15:
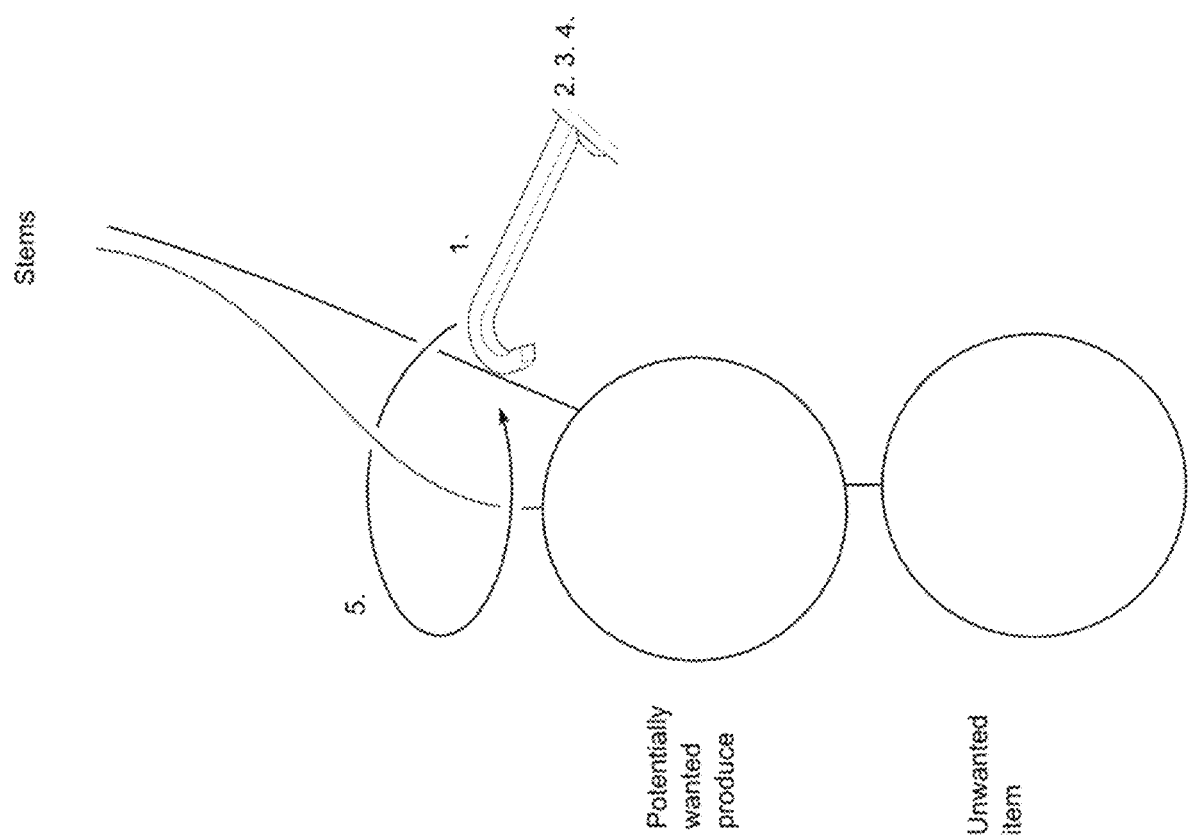
FIG. 15 shows a diagram illustrating the movement of the hook to effect a capture of the plant stem.
Figure 16:
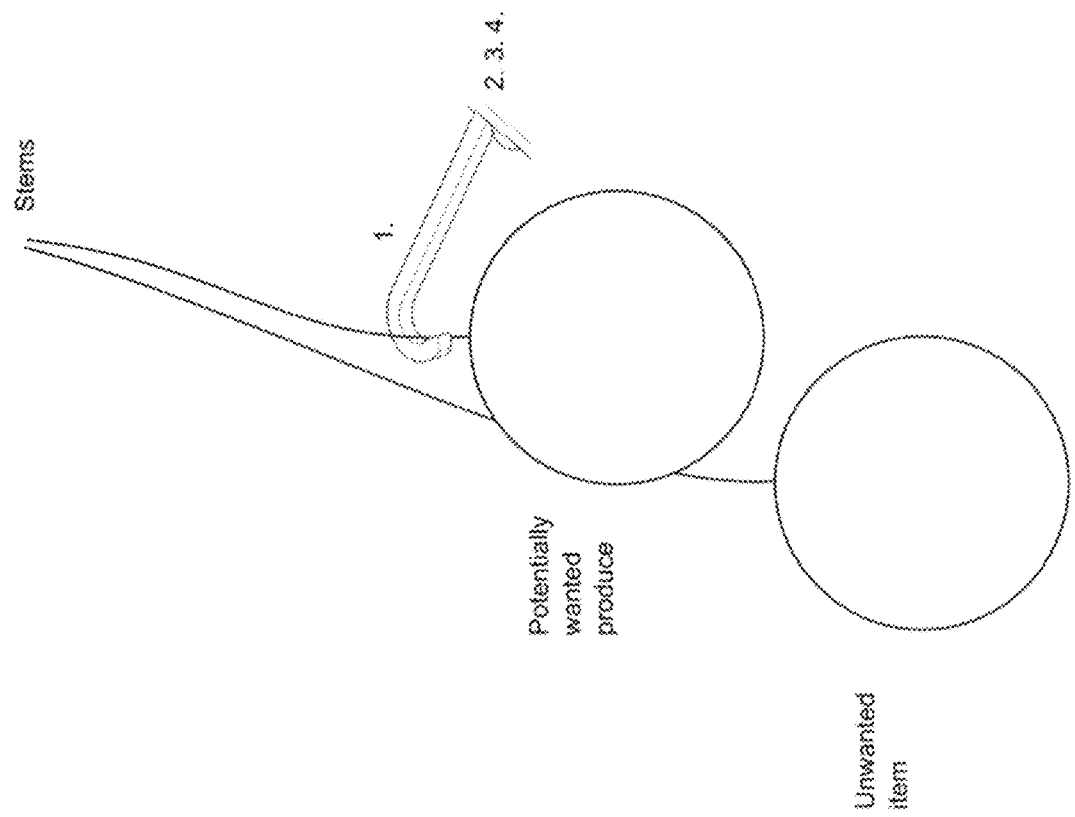
FIG. 16 shows a diagram illustrating the plant stem being captured.
Figure 17:
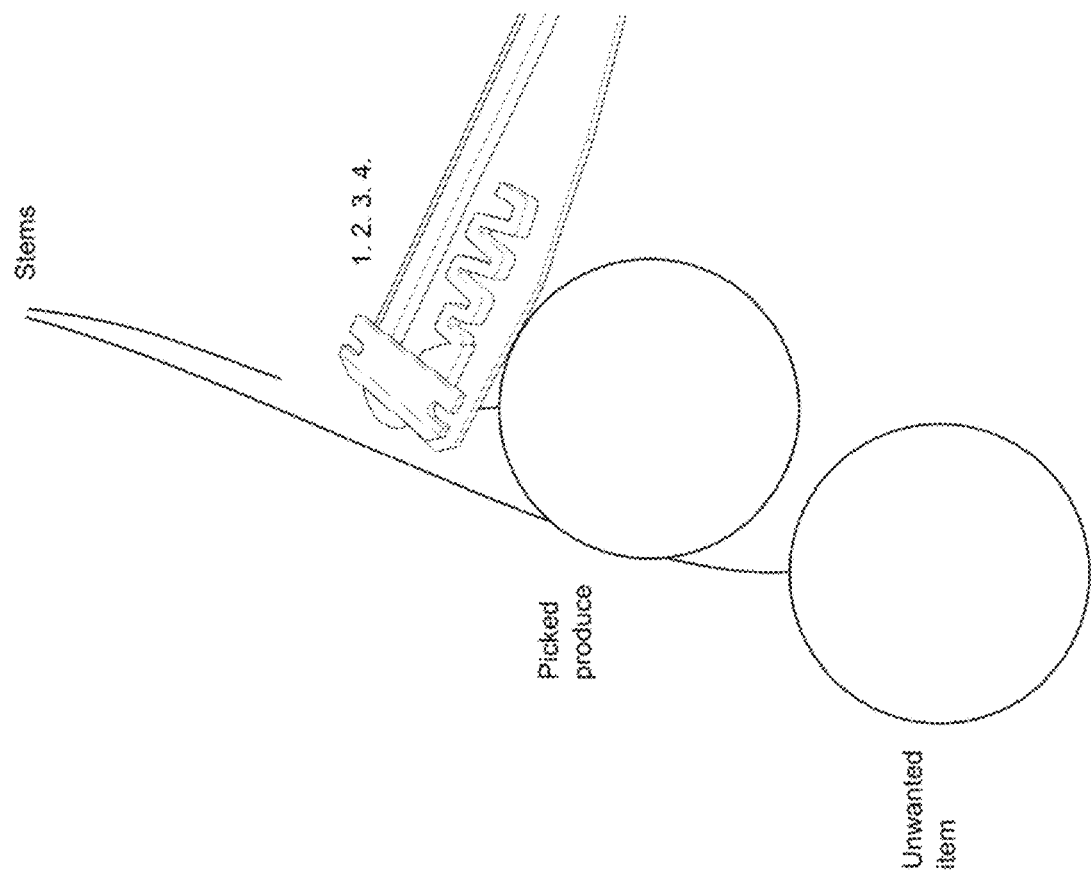
FIG. 17 shows a diagram illustrating the produce being gripped and cut from the parent plant.
Figure 18:
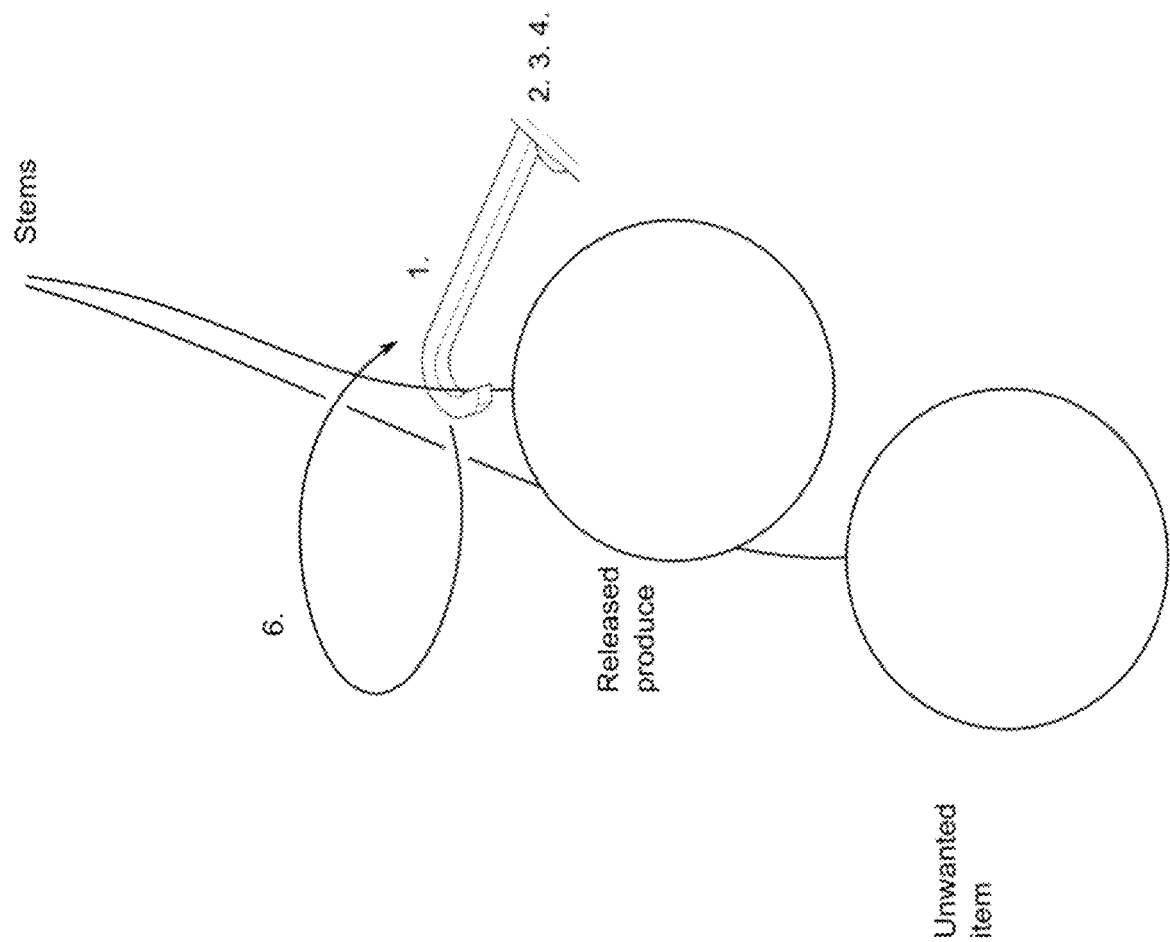
FIG. 18 shows a diagram illustrating the release operation.
Figure 19:
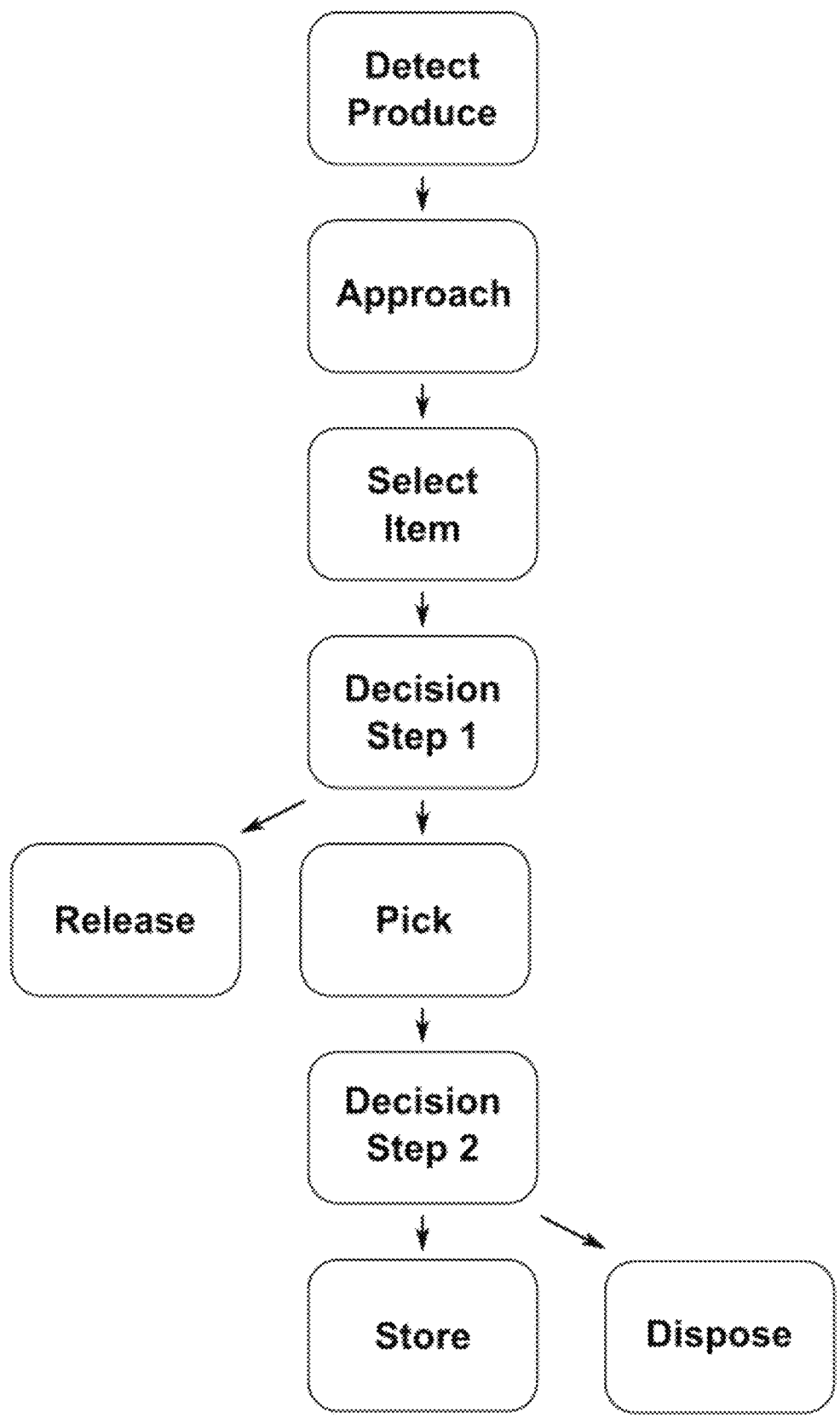
FIG. 19 shows the sequence of operations that constitute the picking process.
Figure 20:
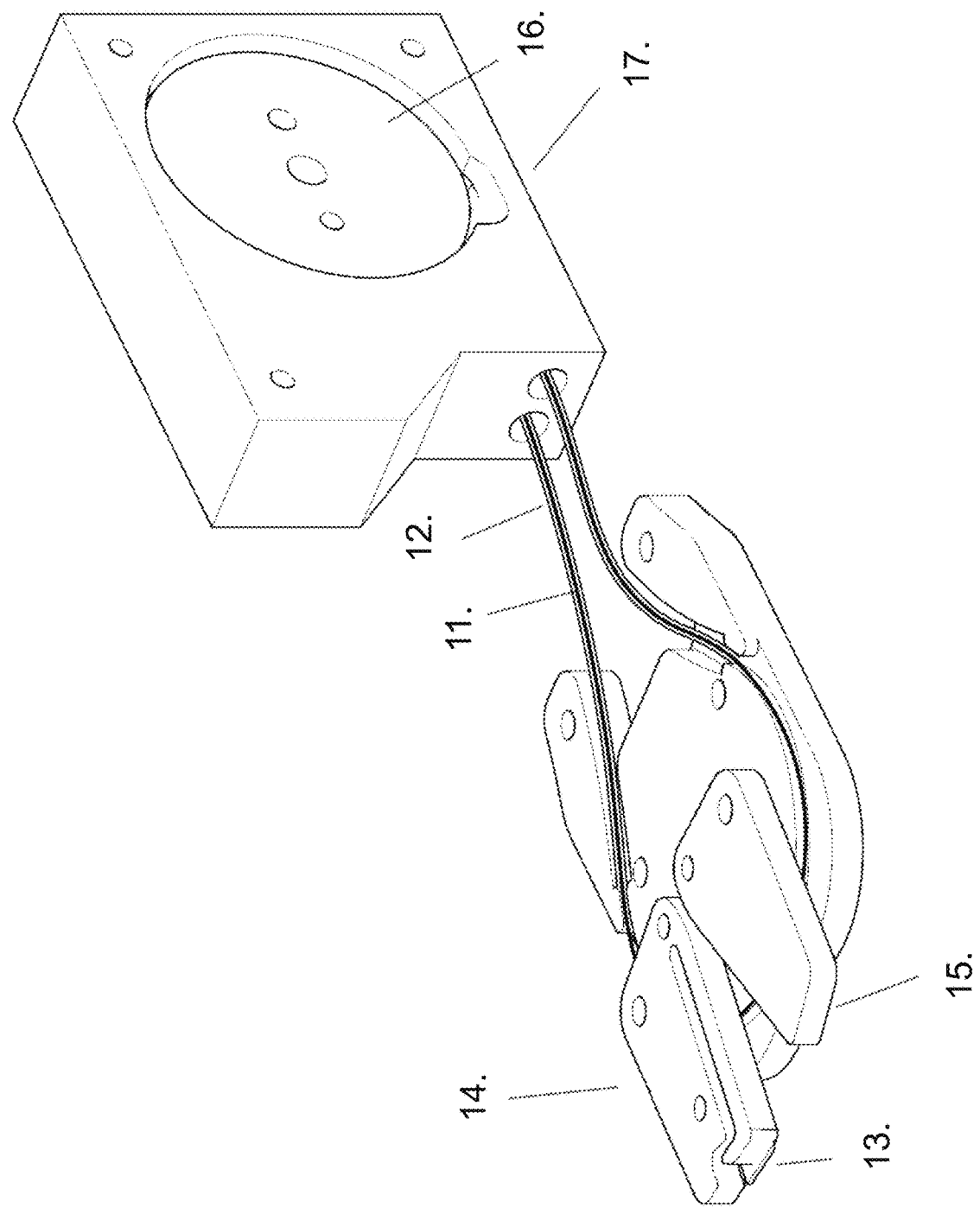
FIG. 20 shows the main mechanical constituents of the loop and jaw assembly.
Figure 21:
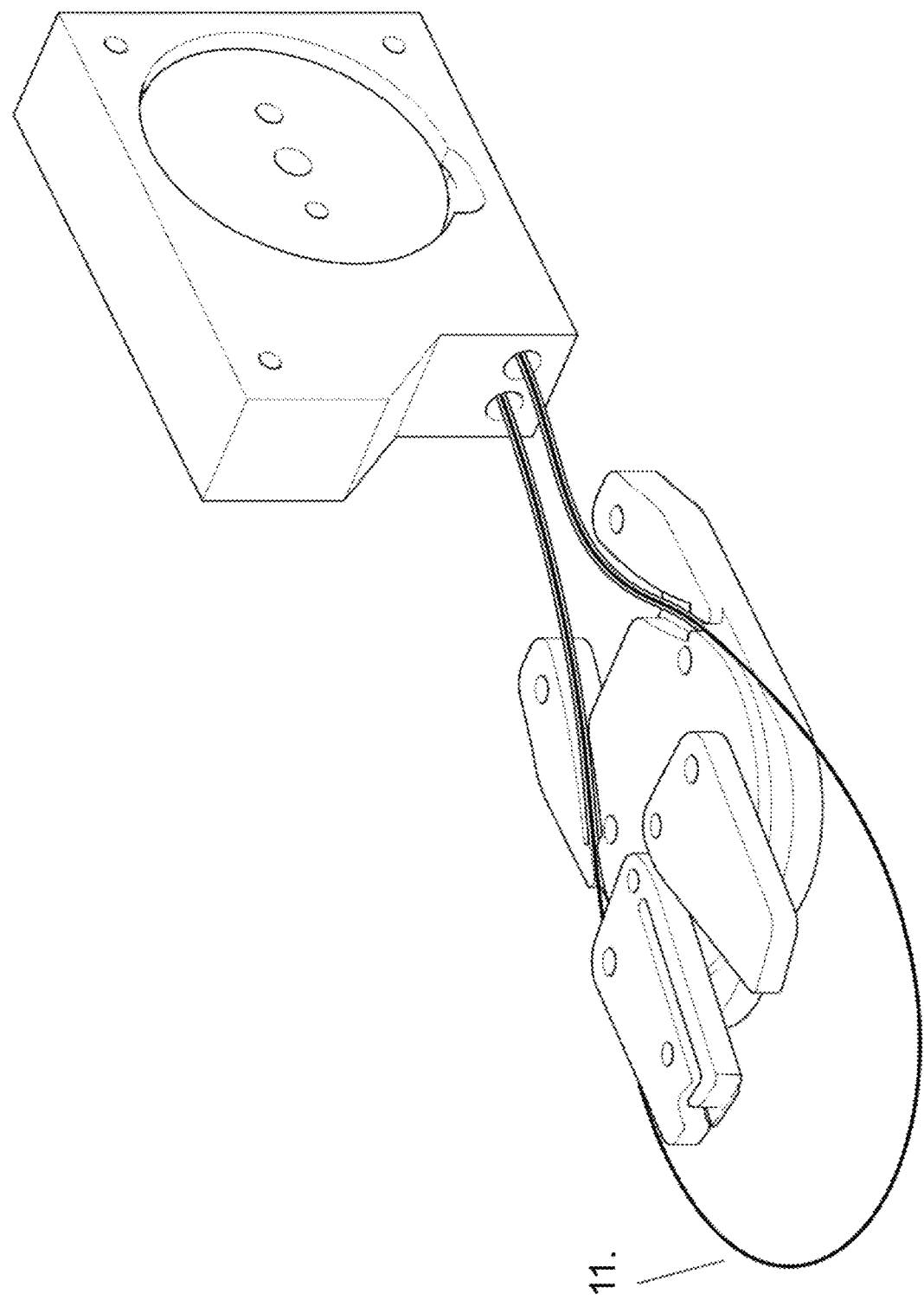
FIG. 21 shows the loop and jaw assembly, shown with component 1, the loop, extended.
Figure 22:
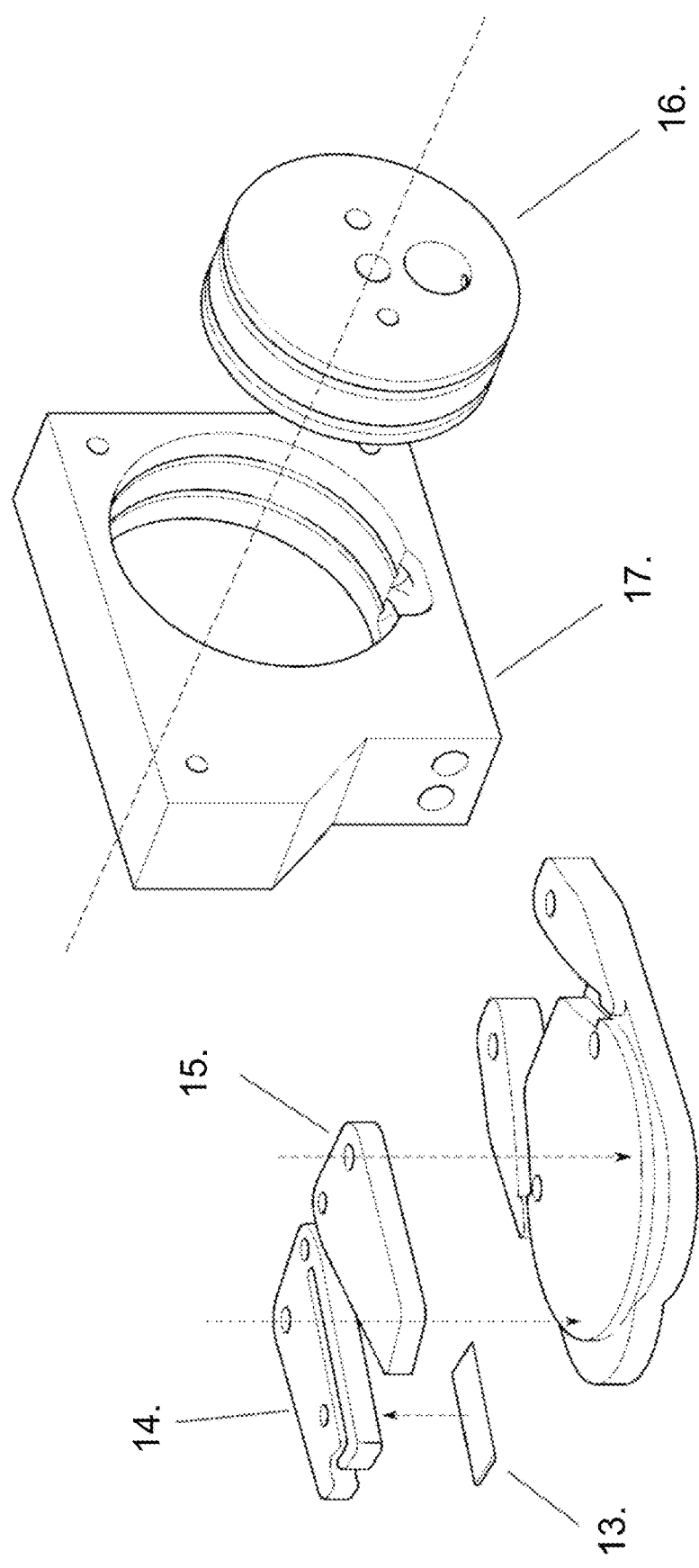
FIG. 22 shows an exploded diagram of the main constituent parts of the loop and jaw assembly (the loop is omitted for clarity).
Figure 23:
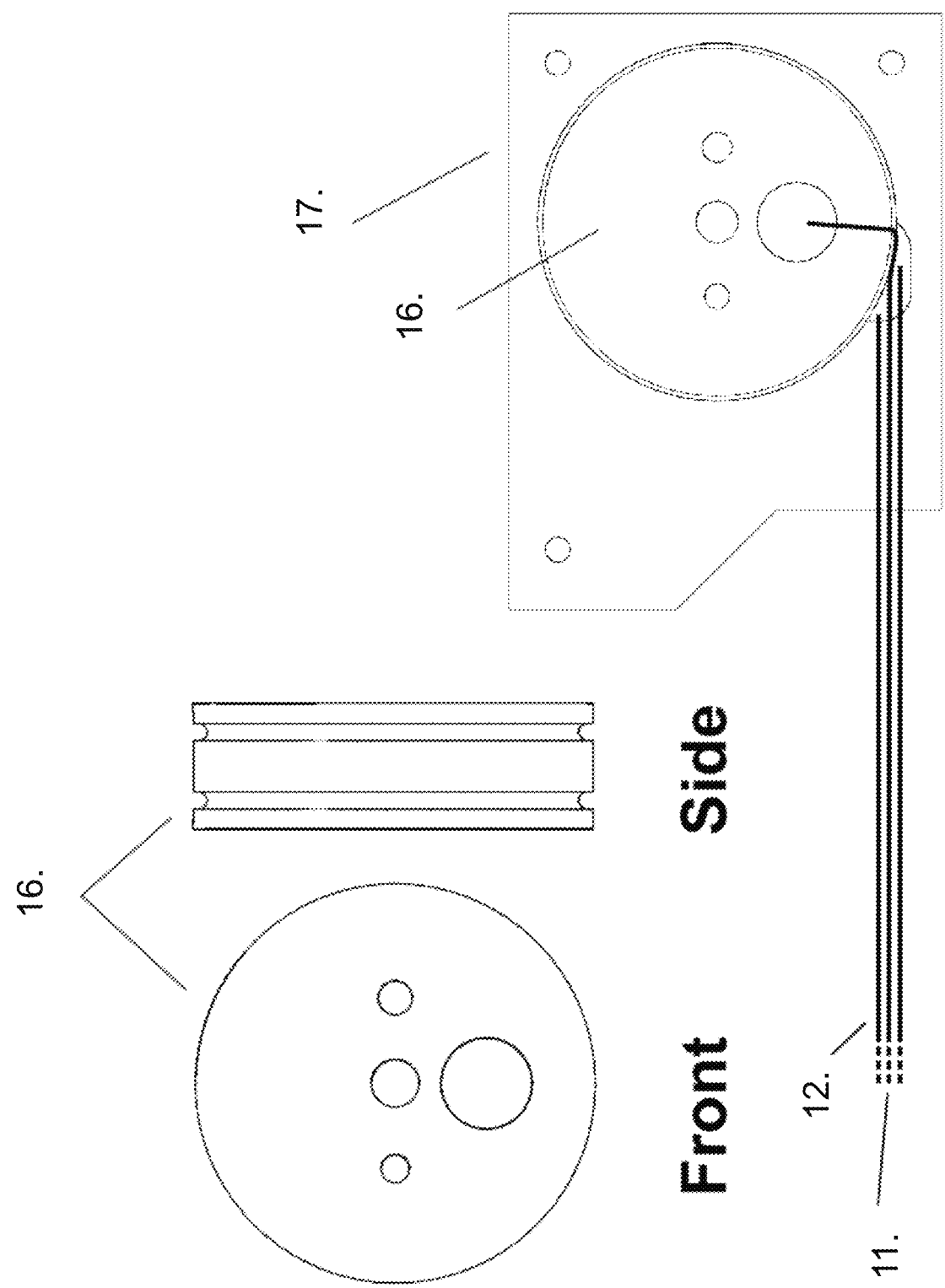
FIG. 23 shows the components of the loop actuation mechanism.
Figure 24:
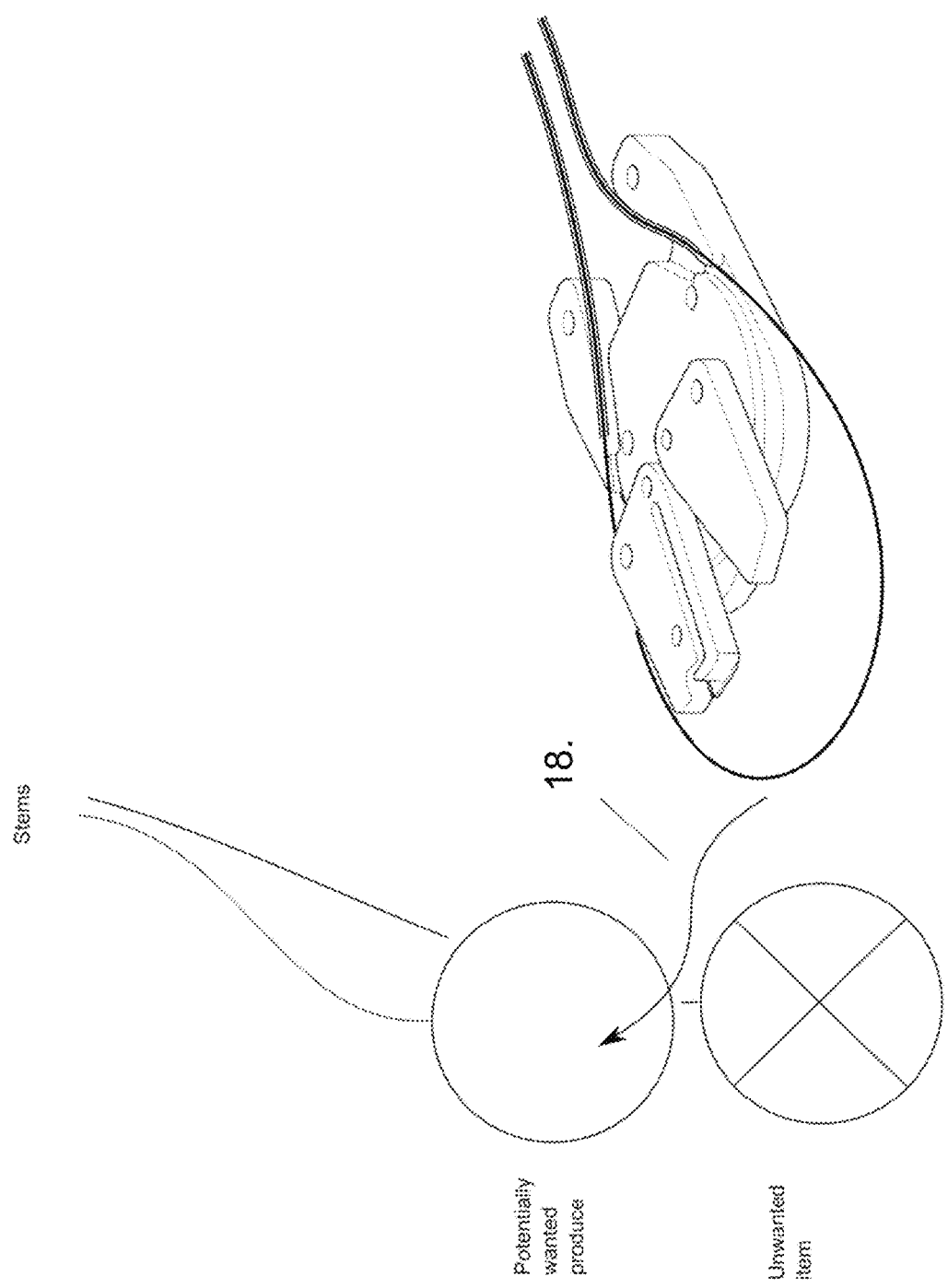
FIG. 24 shows the loop/jaw assembly on its approach vector towards the target fruit.
Figure 25:
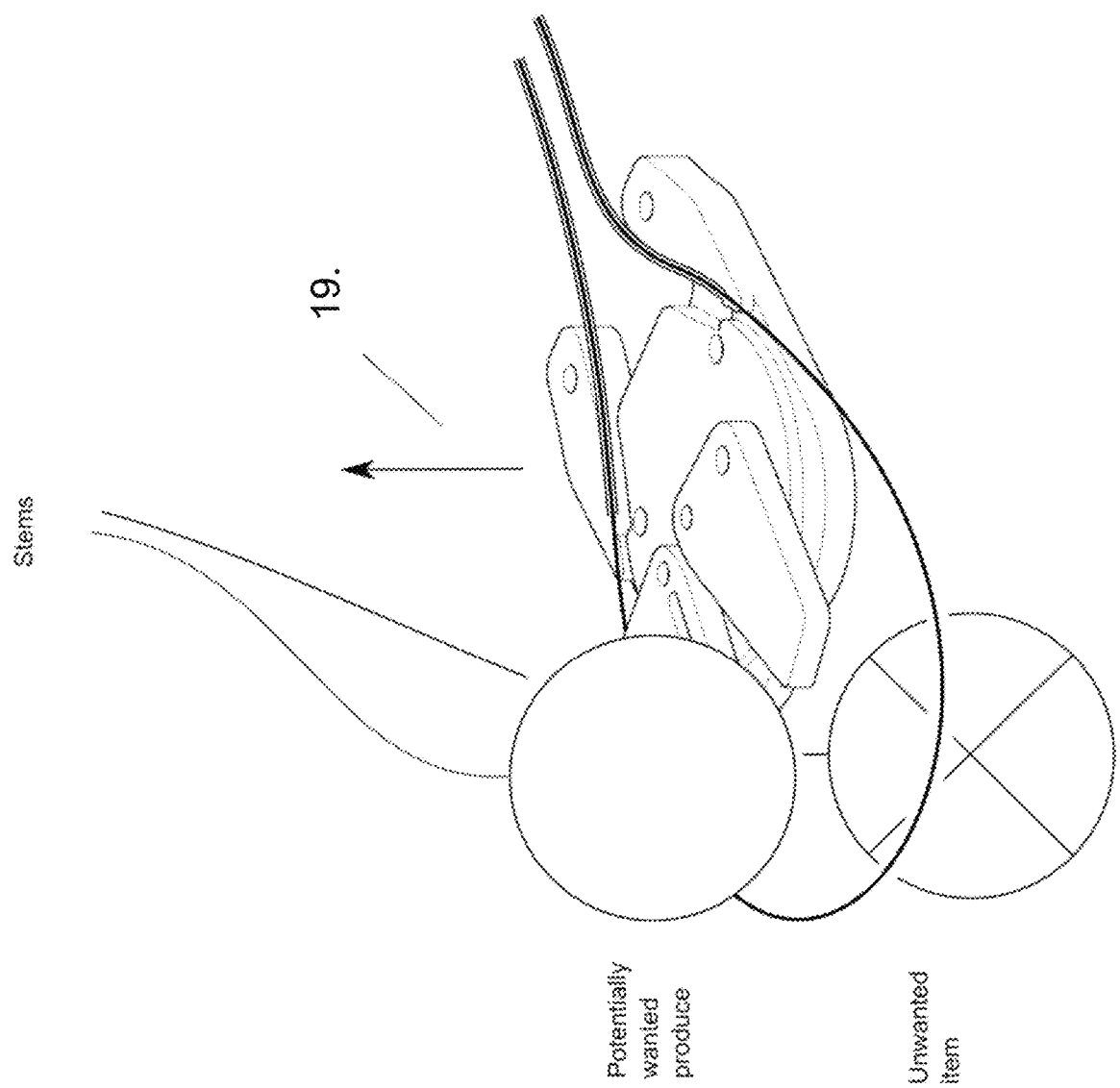
FIG. 25 shows the loop extended and the assembly moving in parallel to the major axis of the target produce and in the direction of the juncture between stalk and fruit.
Figure 26:
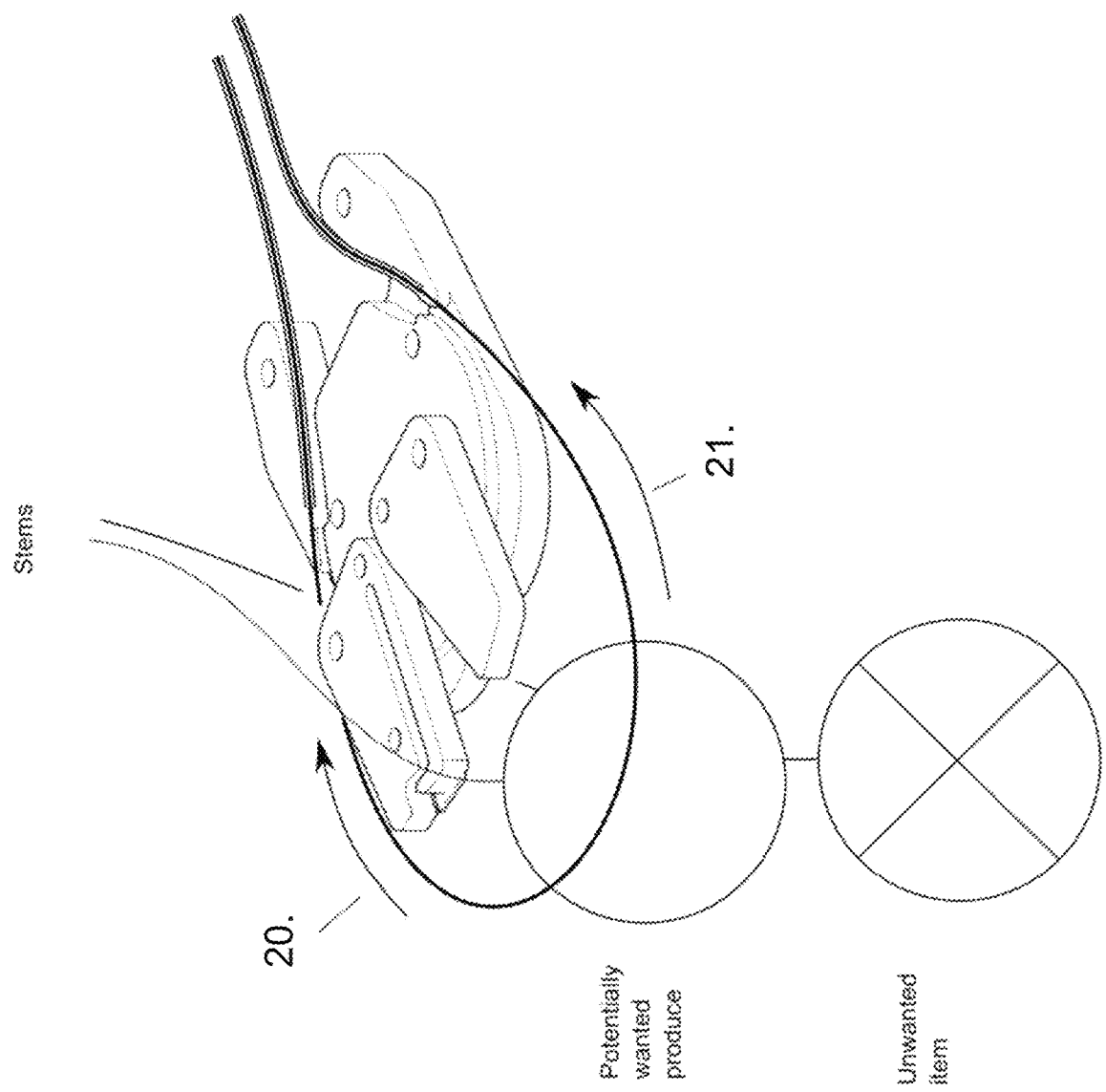
FIG. 26 show the loop having travelled past the juncture of the stalk and the fruit, the target produce is now selected and decision step 1 (FIG. 19) may be applied.
Figure 27:
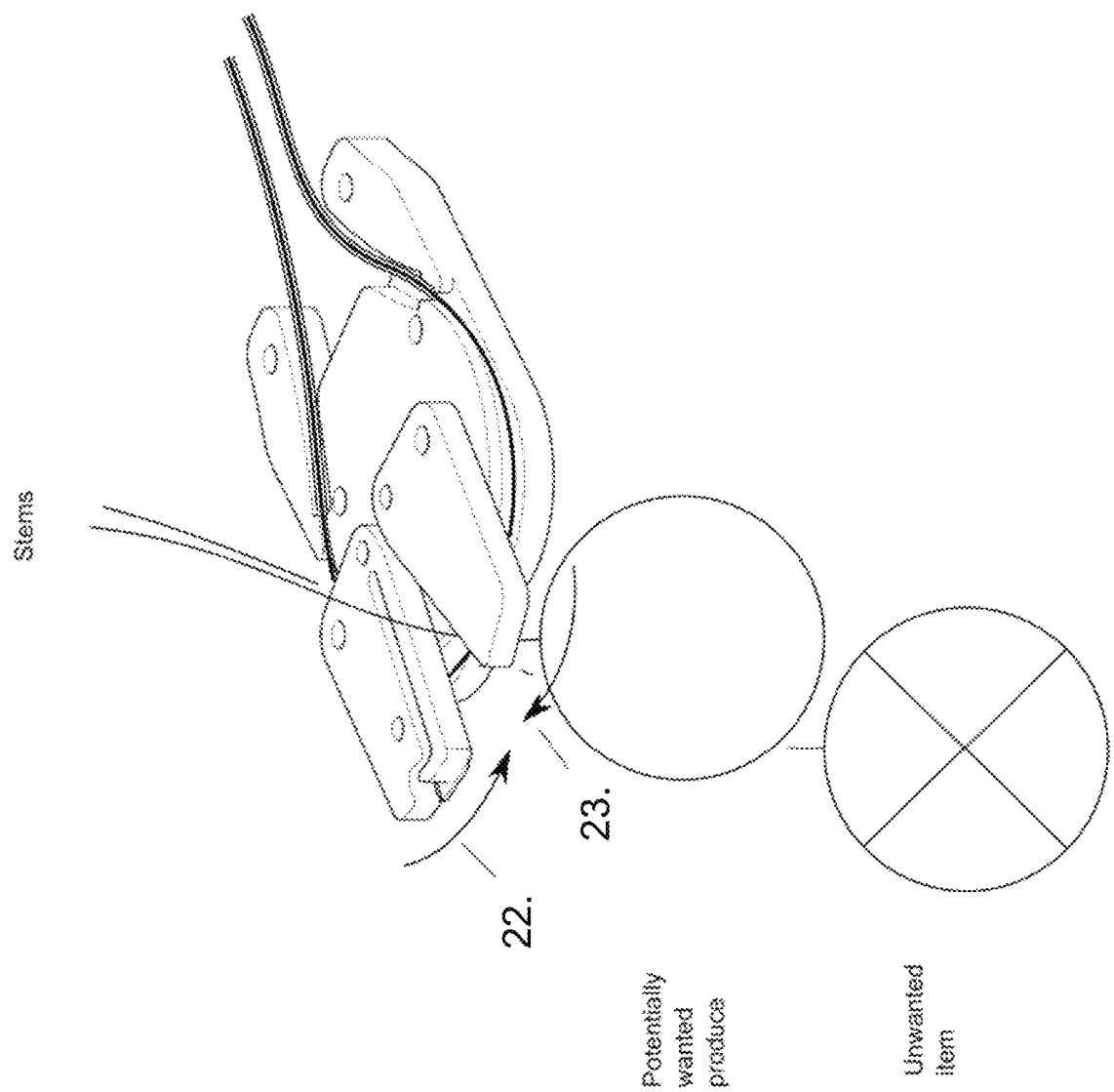
FIG. 27 shows the loop is retracted to control the position of the target produce and the jaw is actuated so as to grab and cut the stalk of the fruit in a scissor-like motion.
Figure 28:
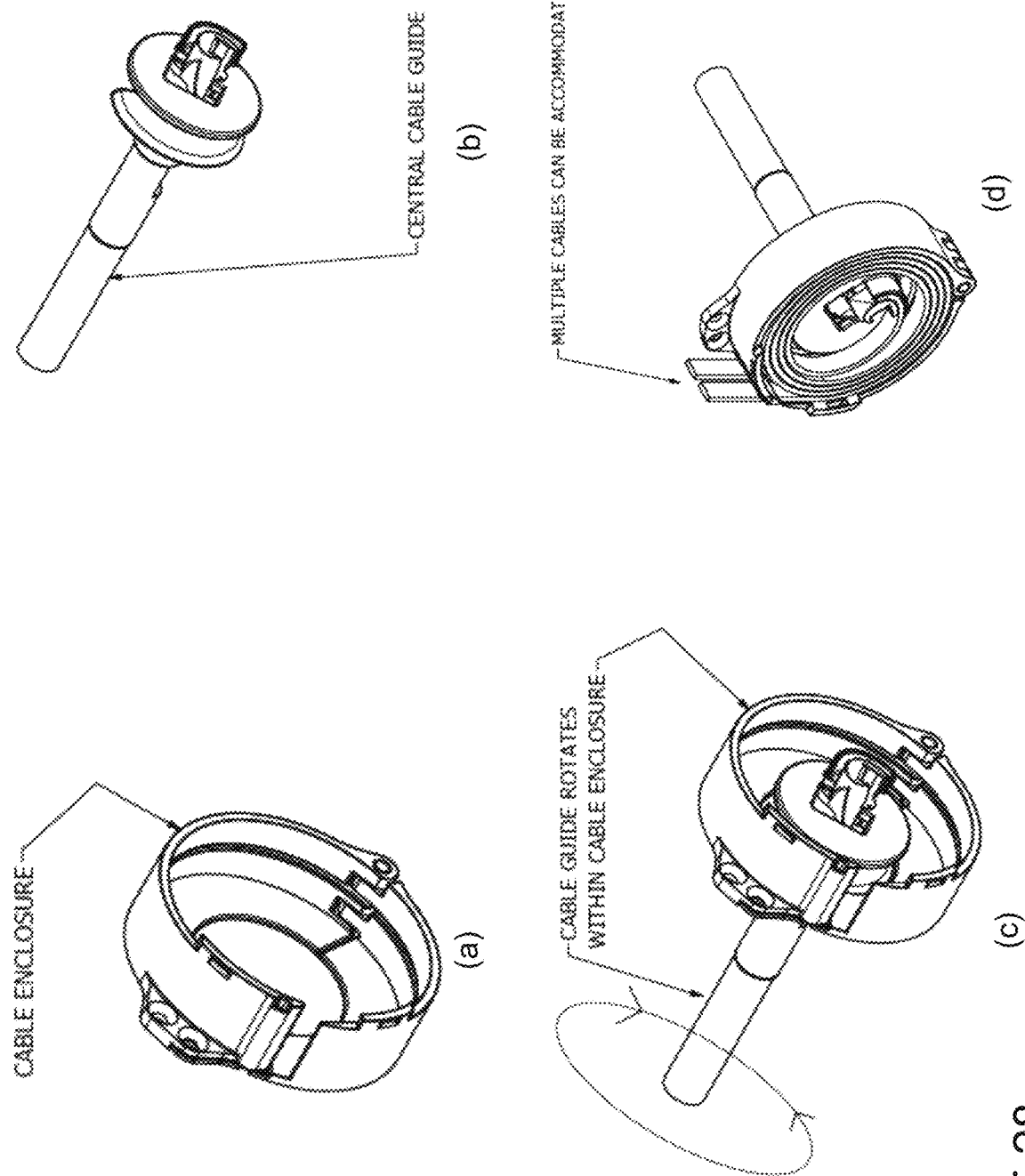
FIG. 28 shows the different elements of the cable management system.
Figure 29:
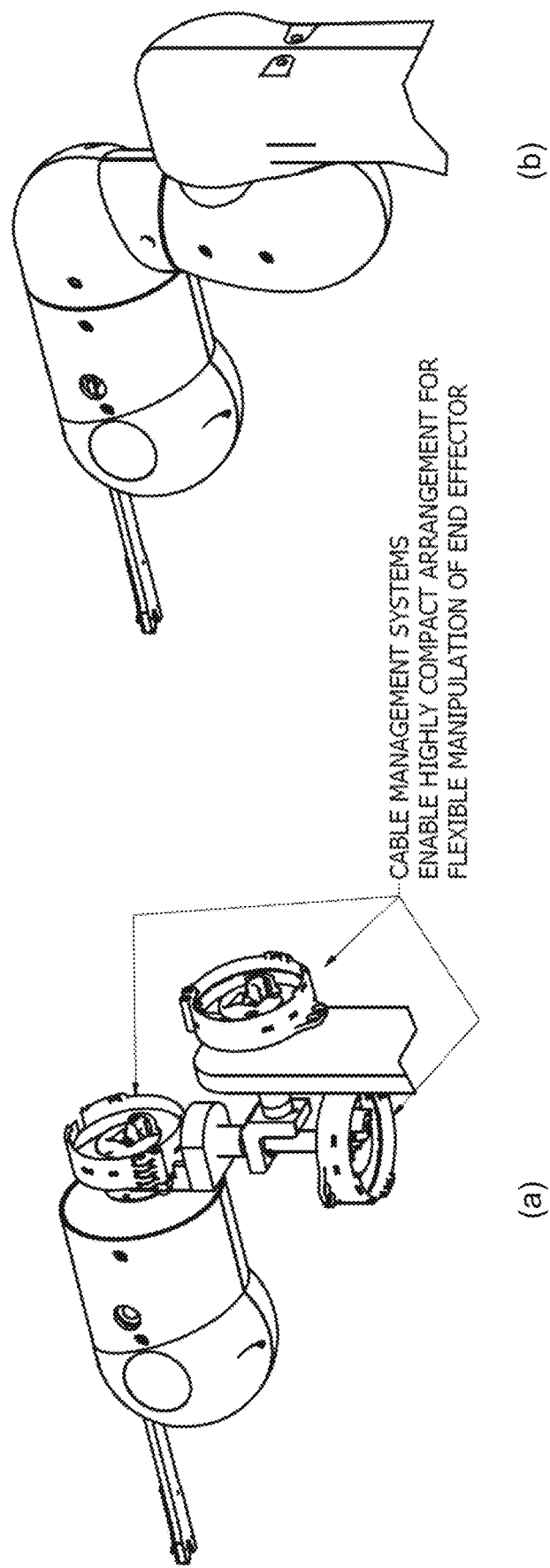
FIG. 29 shows drawings of the cable management system in situ within one of the joints of an arm.
Figure 30:
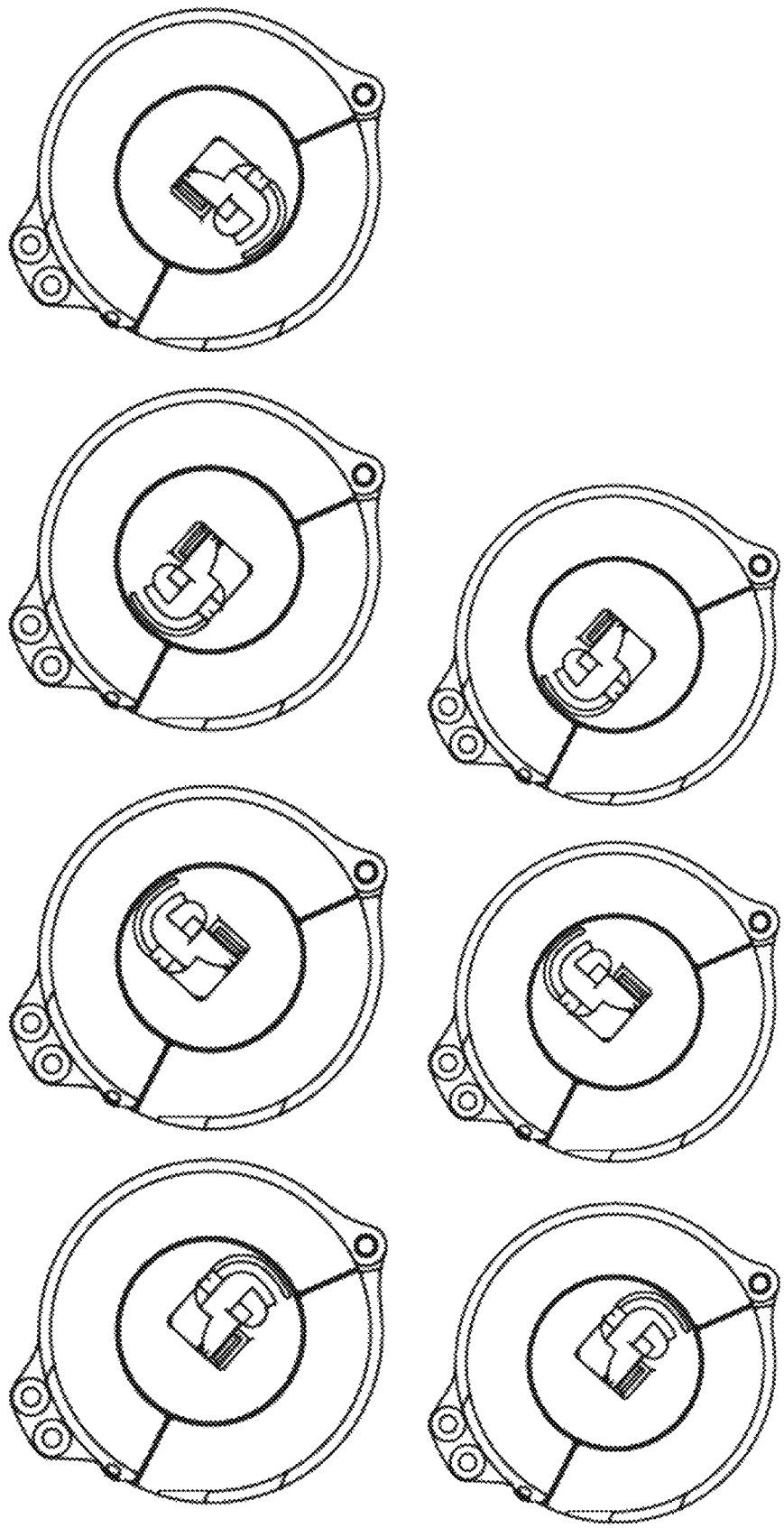
FIG. 30 shows a sequence of drawings with the cable guide rotating within the cable enclosure.
Figure 31:
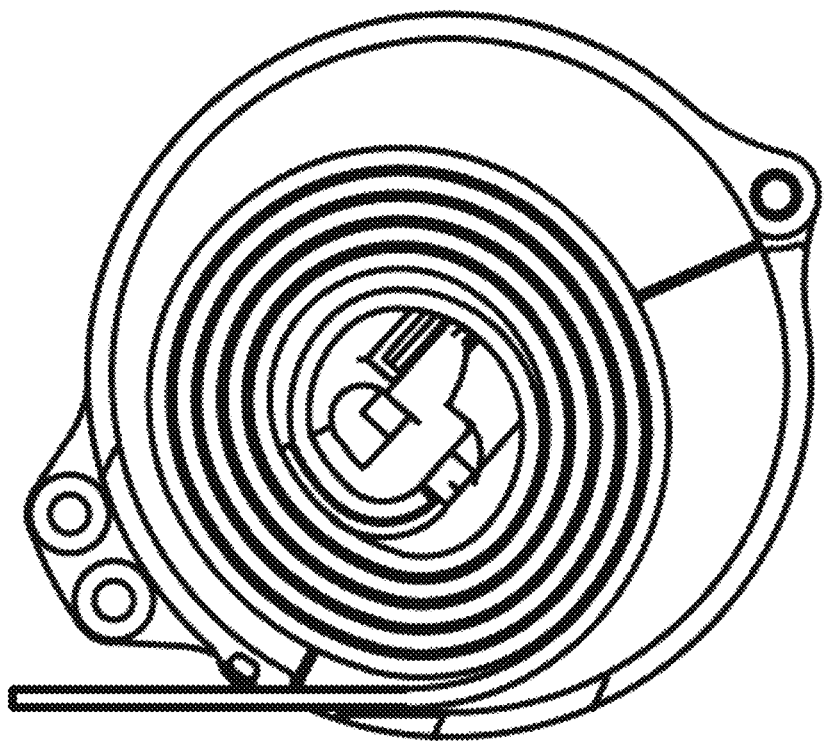
FIG. 31 shows a cutaway view of cable winding.
Figure 31:
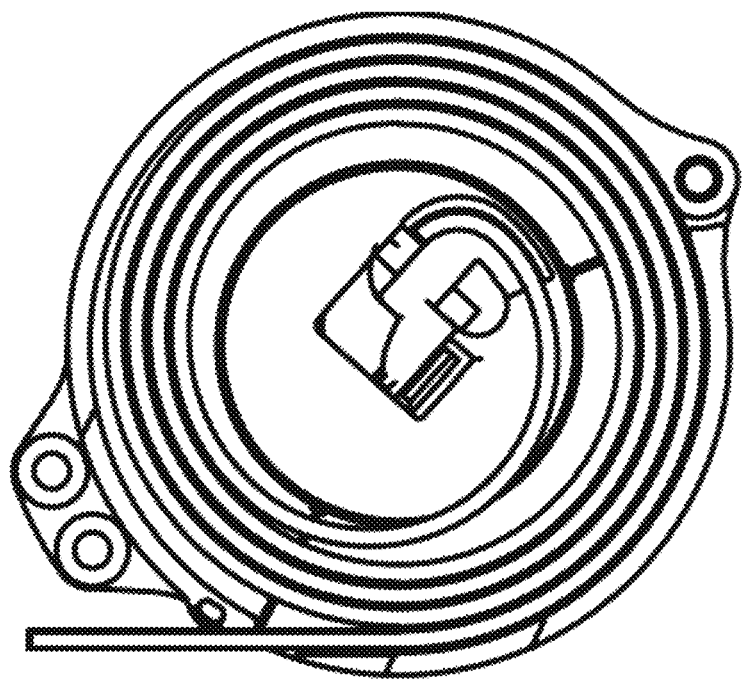

FIG. 10 shows a diagram illustrating a space-saving scheme for storing trays of punnets within a picking robot. Trays of full punnets are stored in one stack (shown right), trays of empty punnets are stored in another (shown left). The Picking Arm can place picked fruit only in the topmost trays. Once the right-hand side topmost tray is full (A), the stack of trays of full punnets descends downwards, a tray slides sideways (B), and the stack of empty trays ascends (C).

Tray removal/replacement may be achieved by a human operator or by automatic means. A useful innovation is a means of drawing the human operator's attention to the need for tray replacement via the combination of a strobe light on the robot itself and a corresponding visual signal in the Management User Interface. A strobe light that flashes in a particular colour or with a particular pattern of flashes may be advantageous in allowing the operator to relate the visual signal in the UI to the specific robot that requires tray replacement or other intervention. Another useful innovation is the idea of using a small, fast moving robot to work in concert with the larger, slower moving picking robot. The small robot can remove trays (or full punnets) automatically from the picking robot and deliver them quickly to a refrigeration unit where they can be refrigerated for subsequent distribution.

For some types of fruit, it is common for the customer (supermarket etc.) to define requirements on the size and quality of fruit in each punnet (or in each tray if punnets). Typical requirements include:
  i. each full punnet has total weight within some allowable tolerance of a nominal value;
  ii. less than some proportion of the fruits in each punnet differ in size by more than some threshold percentage from the mean; and
  iii. less than some proportion of the fruit in each punnet exhibits unusual shape or blemish.

Depending on the contract between the grower and the customer, punnets not meeting these requirements (or e.g. trays containing one or more punnets not meeting these requirements) may be rejected by the customer, reducing the grower's profit. The commercial requirements can be modelled by a cost function that is a monotonically decreasing function of the grower's expected profit from supplying a punnet or tray to a customer. For example, a simple punnet cost function might depend on a linear combination of factors as follows:

$$\text{Cost} = w_0 e + w_1 \cdot u + w_2 \cdot c + w_3 \cdot d$$

Where e means the excess weight of strawberries in the punnet compared to the target weight, u is an indicator variable that is 1 if the punnet is underweight or 0 otherwise, and c is a measure of the number of strawberries that are outside of the desired size range. Finally, d is a measure of how long it will take to place a strawberry in a particular punnet, which is a consequence of how far the arm will have to travel to reach the punnet. The weights $w_1$ reflect the relative importance of these factors to profitability, e.g. $w_1$ reflects the cost of a tray containing an underweight punnet being rejected, weighted by the risk that an additional underweight punnet will cause the tray to be rejected; similarly, $w_3$ reflects the impact on overall machine productivity of spending more time placing strawberries in more distant punnets.

An interesting observation is that distributing the exact same picked fruits differently between punnets could give rise to a different total cost according to the cost function described above. For example, because meeting the punnet weight or other packaging requirements more precisely means that less margin for error is required, so that a greater number of punnets can be filled with the same amount of fruit, or because placing similarly sized fruits in each punnet reduces the likelihood that a tray will be rejected by the customer. Therefore, a useful innovation is a strategy for automating the allocation of picked fruit into multiple punnets (or a discard container) based on size and quality measures to minimize the statistical expectation of total cost according to the metric described earlier, i.e. to maximize expected profitability for the grower. Compared to human pickers, a software system can maintain a more accurate and more complete record of the contents of many punnets simultaneously. Thus, the robot can place picked fruit in any one of many partially filled punnets (or discard picked fruit that is of insufficient size or quality). However, the task is challenging because:

there may be room for only a limited number of partially filled punnets;
as the punnets are filled up, the amount of space available for additional fruit is reduced;
moving picked fruits from punnet to punnet is undesirable because it is time consuming and may damage the fruit; and
the size and quality of yet-to-be-picked fruits is generally not known a priori, and so it is necessary to optimize over possible sequences of picked fruits and associated quality and size grading.

In a simple embodiment of the above idea, each successive picked fruit might be placed to maximize incremental cost decrease according to the cost metric described earlier. However, this greedy local optimization approach will not produce a globally optimal distribution of fruit. A more sophisticated embodiment works by optimizing over the expected future cost of the stream of yet-to-be-picked strawberries. Whist it may not be possible to predict the size or quality of yet-to-be-picked strawberries, it is possible to model the statistical distribution over these properties. This means that global optimization of fruit placement can be achieved by Monte Carlo simulation or similar. For example, each fruit can be placed to minimize total cost considering (i) the known existing placement of strawberries in punnets and (ii) expectation over many samples of future streams of yet-to-be-picked strawberries. A probability distribution (Gaussian, histogram, etc.) describing the size of picked fruits and possibly other measures of quality can be updated dynamically as fruit is picked.

Note that the final term in the above cost function ($w_3 \cdot d$) can be used to ensure that the robot tends to place larger strawberries in more distant punnets. Since punnets containing larger strawberries require fewer strawberries, this innovation minimizes the number of time-consuming arm moves to distant punnets.

Sometimes, the Storage Subsystem cannot place picked fruit into any available punnet without increasing the expected cost (i.e. reducing expected profitability), for example because a strawberry is too large to be placed in any available space, or because its quality or size cannot be determined with high statistical confidence. Therefore, another useful innovation is to have the robot place such fruits into a separate storage container for subsequent scrutiny and possible re-packing by a human operator.

For fruits that are picked in bunches comprising several individual fruits on the same branch structure, e.g. table grapes or on-the-vine tomatoes, it may be important that none of the individual fruits is damaged or otherwise blemished, for example because a single rotten fruit can shorten the life or spoil the appearance of the entire bunch. Therefore, a valuable innovation is a two-phase picking procedure in which first the entire bunch is picked and second unsuitable individual fruits are removed from it. In one embodiment, this might work as follows:

1. A first robot arm picks the bunch by severing the stalk.
2. Visual inspection of the bunch is performed to determine the positions of any blemished individual fruits. During visual inspection, the first robot arm continues to hold the bunch for visual inspection.
3. A second robot arm trims blemished fruits from the bunch. A picking head similar to that used to pick individual fruits like strawberries singly can also be used to trim individual fruits from a bunch.

In another embodiment of this idea, a first robot arm might transfer the bunch to a static support for subsequent inspection and removal of unwanted individual fruits. By this means, it is possible to use only a single robot arm.

As well as deciding into which punnet (or other container) picked fruit should be placed, it may also be necessary or beneficial for a robot to decide where in the target punnet to place the fruit. A key challenge is to place picked fruit so as to minimize bruising (or other kinds of damage) due to collisions with the walls of floor of the punnet or with other fruit already in the punnet. In the context of fruit picking systems that work by gripping the stalk of the fruit, another challenge is to determine the height at which the fruit should be released into the punnet—too high and the fruit may be bruised on impact, too low and the fruit may be squashed between the gripper and the base of the punnet. Additionally, picked fruit doesn't necessarily hang vertically because the stalk is both non-straight and somewhat stiff. Therefore, a useful innovation is to measure the vertical displacement between the base of the fruit and the point at which it is gripped or the pose of the picked fruit in an end effector coordinate system, so that the fruit can be released at the optimal height. This can be achieved by using a monocular or stereo camera to determine the position of the bottom of the picked fruit relative to the (presumed known) position of the gripper. A related innovation is to use an image of the punnet (obtained by the cameras in the Picking Head or otherwise) to determine the position of other picked fruit already in the punnet. Then the position or release height can be varied accordingly. For fruits such as strawberries that may be usefully held by their stalks, another useful innovation is to orientate the gripper such that the stalk is held horizontally before the fruit is released into the storage container. This allows the compliance of the section of stalk between the gripper and the body of the fruit to be used to cushion the landing of the fruit when it is placed into the container.

A related innovation is to position and orientate the fruit automatically to maximize visual appeal. This might be achieved, for example, by placing fruit with consistent orientation.

Because the robot knows which fruit was placed in each punnet, it can keep a record of the quality of the punnet. Therefore, a useful innovation is to label each punnet with bar code that can be read by the robot and therefore used to related specific back to the record of which fruit the punnet contains.

8. Mapping Subsystem

A human supervisor uses the Management User Interface to indicate on a map where robots should pick (see below). A prerequisite is a geo-referenced 2D map of the environment, which defines both (i) regions in which robots are free to choose any path (subject to the need to traverse the terrain and to avoid collision with other robots) and (ii) paths along which the robot must approximately follow, e.g. between rows of growing plants. The robot can pick from plants that are distributed irregularly or regularly, e.g. in rows.

A suitable map may be constructed by a human supervisor using the Mapping Subsystem. To facilitate map creation, the Mapping Subsystem allows a human operator easily to define piecewise-linear paths and polygonal regions. This is achieved by any of several means:

Using geo-referenced aerial imagery and image annotation software. The UI allows the user to annotate the aerial imagery with the positions of the vertices of polygonal regions and sequences of positions defining paths, e.g. via a series of mouse clicks. When annotating the start and end points of rows of crops, an integer-based row indexing scheme is used to facilitate logical correspondence between the start and end locations.

Using a physical survey device, the position of which can be determined accurately, e.g. via differential GPS. The user defines region boundaries by positioning the surveying tool manually, e.g. at a series of points along a path, or at the vertices of a polygonal region. A simple UI device such as a button allows the user to initiate and terminate definition of a region. The survey device may be used to define the physical locations of (i) waypoints along shared paths, (ii) the vertices of polygonal regions in which the robot can choose any path, (iii) at the start and end of a row of crops. The survey device may be a device designed for handheld use or a robot vehicle capable of moving under radio remote control.

In the context of farming, an important concern is that heavy robots may damage soft ground if too many robots take the same route over it (or if the same robot travels the same route too many times). Therefore, a useful innovation is to choose paths within free regions to distribute routes over the surface of the ground as far as possible. A tuneable parameter allows for trade-off between travel time and distance and the degree of spread.

9. Management Subsystem

The Management Subsystem (including its constituent Management User Interface) has several important functions:

It allows a human supervisor to define which rows of crops should be picked using a 2D map (created previously using the Mapping Subsystem).

It allows a human supervisor to set the operating parameter values to be used during picking and QC, e.g. the target ranges of fruit size and ripeness, the quality metric to be used to decide whether to discard or keep fruit, how to distribute fruits between punnets, etc.

It facilitates the movement of robots around the farm.

It divides work to be done amongst one or more robots and human operators.

It controls the movement of the robot along each row of strawberries.

It allows robots to signal status or fault conditions to the human supervisor.

It allows the human supervisor immediately to put any or all robots into a powered down state.

It allows the human supervisor to monitor the position and progress of all robots, by displaying the position of the robots on a map.

If there are multiple robots, then they collaborate to ensure they can move around in the same vicinity without colliding.

In case fully autonomous navigation of the robots around a site is undesirable for safety or other reasons, it may be desirable for robots to be capable of being driven temporarily under human remote control. Suitable controls might be made available by a radio remote control handset or by a software user interface, e.g. displayed by a tablet computer.

To obviate the need for the human operator to drive several robots separately (e.g. from a storage container to the picking site), a valuable innovation is a means by which a chain of several robots can automatically follow a single 'lead' robot driven under human control. The idea is that each robot in the chain follows its predecessor at a given approximate distance and takes approximately the same route over the ground.

A simple embodiment of this idea is to use removable mechanical couplings to couple the second robot to the first and each successive robot to its predecessor. Optionally a device to measure the direction and magnitude of force being transmitted by a robot's coupling to its predecessor might be used to derive a control signal for its motors. For example, a following robot might always apply power to its wheels or tracks in such a way as to minimize or otherwise regulate the force in the mechanical coupling. By this means all the robots in the chain can share responsibility for providing motive force.

More sophisticated embodiments of this idea obviate the need for mechanical couplings by using a combination of sensors to allow robots to determine estimates of both their absolute pose and their pose relative to their neighbours in the chain. Possibly a communication network (e.g. a WiFi network) might be used to allow all robots to share time-stamped pose estimates obtained by individual robots. An important benefit is the possibility of combining possibly-noisy relative and absolute pose estimates obtained by many individual robots to obtain a jointly optimal estimate of pose for all robots. In one such embodiment, robots might be equipped with computer vision cameras designed to detect both absolute pose in the world coordinate system and their pose relative to their neighbours. Key elements of this design are described below:

The robot is designed to have visually distinctive features with known position or pose in a standard robot coordinate frame. For example, visually distinctive markers might be attached to each robot in certain pre-determined locations. The markers are typically designed for reliable automatic detection in the camera images.

A camera (or cameras) is (are) attached to each robot with known pose in a standard robot coordinate frame. By detecting the 2D locations in its own camera image frame of visually distinctive features belonging to a second robot, one robot can estimate its pose relative to that of the second robot (e.g. via the Discrete Linear Transformation). Using visually distinctive markers that are unique to each robot (e.g. a bar code or a QR code or a distinctive pattern of flashes made by a flashing light) provides means by which a robot can uniquely identify the robot that is following it or being followed by it.

One or more robots in the chain also maintain an estimate of their absolute pose in a suitable world coordinate system. This estimate may be obtained using a combination of information sources, e.g. differential GPS or a computer-vision based Simultaneous Localization and Mapping (SLAM) system. Absolute position estimates from several (possibly noisy or inaccurate) sources may be fused to give less noisy and more accurate estimates.

Inter-robot communications infrastructure such as a wireless network allows robots to communicate with each another. By this means robots can interrogate other robots about their current pose relative to the robot in front. Pose information is provided along with a time stamp, e.g. so that the moving robots can compensate for latency when fusing pose estimates.

In a chain of robots, the absolute and relative position estimates obtained by all robots are fused to obtain a higher quality estimate of the pose of all robots.

A PID control system is used by each robot to achieve a desired pose relative to the trajectory of the lead robot. Typically, a target position for the control system is obtained by finding the point of closest approach on the lead robot's trajectory. The orientation of the target robot when it was previously at that point defines the target orientation for the following robot. Target speed may be set e.g. to preserve a constant spacing between all robots.

When picking, teams of robots may become dispersed over a large area. Because robots are visually similar, this may make it very difficult for human supervisors to identify individual robots. To allow the human supervisor to relate robot positions displayed on a 2D map in the software UI to robot positions in the world, a useful innovation is to equip each robot with a high visibility strobe light that gives an indication in response to a mouse click (or other suitable UI gesture) on the displayed position in the UI. Individual robots can be made more uniquely identifiable by using strobes of different colours and different temporal sequences of illumination. A related innovation is to direct the (possibly coloured) light produced by the strobe upwards onto the roof of the polytunnel in which the crops are being grown. This facilitates identification of robots hidden from view by tall crops or the tables on which some crops (like strawberries) are grown.

Because a single human supervisor may be responsible for multiple robots working simultaneously, it is useful if the UI exposes controls (e.g. stop and start) for each robot in the team. However, one difficulty is to know which remote control setting is necessary to control which robot. In a situation where an emergency stop is needed, therefore, the system is typically designed so that pressing the emergency stop button (for example on the supervisor's tablet UI) will stop all robots for which the supervisor is responsible. This allows the supervisor to determine which robot was which after ensuring safety.

While picking, it is possible that robots will encounter so-called fault conditions that can be only be resolved by human intervention. For example, a human might be required to remove and replace a full tray of picked fruit or to untangle a robot from an obstacle that has caused it to become mechanically stuck. This necessitates having a human supervisor to move from robot to robot, e.g. by walking. To allow a human supervisor to do this efficiently, a useful innovation is to use information about the position of the robots and the urgency of their fault conditions (or impending fault conditions) to plan the human supervisor's route amongst them. Route planning algorithms can be used e.g. to minimize the time or that human supervisors spend moving between robots (and therefore to minimize the number of human supervisors required and their cost). Standard navigation algorithms need to be adapted to account for the fact that the human operator moves at finite speed amongst the moving robots.

10. Robot Control Subsystem 10.1 Overview

Whilst the robot is picking, the Robot Control Subsystem makes a continuous sequence of decisions about which action to perform next. The set of actions available may include (i) moving the whole robot forwards or backwards (e.g. along a row of plants), (ii) moving the Picking Arm and attached camera to previously unexplored viewpoints so as to facilitate detection of more candidate fruit, (iii) moving the Picking Arm and attached camera in the local vicinity of some candidate fruit so as to refine an estimate of its pose or suitability for picking, and (iv) attempting to pick candidate fruits (at a particular hypothesized position/orientation). Each of these actions has some expected cost and benefit. E.g. spending more time searching for fruit in a particular vicinity increases the chances that more fruit will be picked (potentially increasing yield) but only at the expense or more time spent (potentially decreasing productivity). The purpose of the Robot Control System is to schedule actions, ideally in such a way as to maximize expected profitability according to a desired metric.

In a simple embodiment, the Robot Control Subsystem might move the whole robot and the picking head and camera in an alternating sequence of three phases. In the first phase, the arm moves systematically, e.g. in a grid pattern, recording the image positions of detected fruits as it does so. In the second phase, the picking head and camera move to a position near each prospective target fruit in turn, gathering more image data or other information to determine (i) whether or not to pick the fruit and (ii) from what approach direction to pick it. During this second phase, the system determines how much time to spend gathering more information about the target fruit on the basis of a continuously refined estimate of the probability of picking a suitable fruit successfully (i.e. picking success probability). When the estimated picking success probability is greater than some threshold, then picking should take place. Otherwise the control system might continue to move the arm until either the picking success probability is greater than the threshold or some time limit has expired. In the third phase, once all detected fruits have been picked or rejected for picking then the whole robot might move along the row of plants by a fixed distance.

10.2 Total Position Control

During picking, the Control Subsystem uses the Total Positioning Subsystem to move the whole robot amongst the plants and within reach of fruit that is suitable for picking, e.g. along a row of strawberry plants. Typically, the robot is moved in a sequence of steps, pausing after each step to allow any fruit within reach of the robot to be picked. It is advantageous to use as few steps as possible, e.g. because time is required for the robot to accelerate and decelerate during each step. Furthermore, because the time required to pick the within-reach fruit depends on the relative position of the robot to the fruit, it is advantageous to position the robot so to minimize expected picking time. Thus, a valuable innovation is to choose the step sizes and directions dynamically so as to try to maximize expected picking efficiency according to a suitable model.

In a simple embodiment of this idea, a computer vision camera might be used to detect target fruit that is nearby but outside of the robot's present reach. Then the robot can be either (i) repositioned so as to minimize expected picking time for the detected fruit or (ii) moved a greater distance if no suitable fruit was detected in its original vicinity. Additionally, a statistical model of likely fruit positions might be used to tune step size. The parameters of such a statistical model might be refined dynamically during picking.

10.3. Robot Arm Path Planning

The Picking Arm and attached camera moves under the control of the Control Subsystem to locate, localize, and pick target fruits. To enable the arm to move without colliding with itself or other obstacles, a path planning algorithm is used to find collision-free paths between an initial configuration (i.e. vector of joint angles) and a new configuration that achieves a desired target end effector pose. Physics simulation based on a 3D model of the geometry of the arm and the scene can be used to test whether a candidate path will be collision free. However, because finding a collision-free path at runtime may be prohibitively time consuming, such paths may be identified in advance by physical simulation of the motion of the robot between one or more pairs of points in the configuration space—thereby defining a graph (or 'route map') in which the nodes correspond to configurations (and associated end effector poses) and edges correspond to valid routes between configurations. A useful innovation is to choose the cost (or 'length') assigned to each edge of the graph to reflect a weighted sum of factors that reflect the overall commercial effectiveness of the picking robot. These might include (i) the approximate time required, (ii) the energy cost (important in a battery powered robot), and (iii) the impact of component wear on expected time to failure of robot components (which influences service intervals, downtime, etc.). Then path planning can be conducted as follows:

1. Search over the nodes of the graph to find a configuration C0 that can be reached without collision by a linear move from the initial configuration Ci.
2. Search over the nodes of the graph to find a configuration C1 from which the target pose can be reached without collision by a simple linear move. Configurations corresponding to the target pose can be determined by inverse kinematics, possibly using the configuration associated with each candidate configuration as starting point for non-linear optimization.
3. Find the shortest path in the graph between nodes C0 and C1, e.g. using Djikstra's algorithm or otherwise.

One limitation of this approach is that the graph can only be precomputed for known scene geometry—and in principle the scene geometry could change every time the robot moves, e.g. along a row of crops. This motivates an interesting innovation, which is to build a mapping between regions of space ('voxels') and the edges of the route map graph corresponding to configuration space paths that would cause the robot to intersect that region during some or all of its motion. Such a mapping can be built easily during physical simulation of robot motion for each edge of the graph. By approximating real and possibly frequently changing scene geometry using voxels, those edges corresponding to paths which would cause the arm to collide with the scene can be quickly eliminated from the graph at runtime. A suitable voxel-based model of approximate scene geometry might be obtained using prior knowledge of the geometry of the growing infrastructure and the pose of the robot relative to it. Alternatively, a model may be formed dynamically by any of a variety of means, such as depth cameras, ultrasound, or stereo vision.

In the context of fruit picking, some kinds of collision may not be catastrophic, for example, collision between the slow-moving arm and peripheral foliage. Therefore, another useful innovation is to use a path planning algorithm that models obstacles not as solid object (modelled e.g. as bounding boxes), but as probabilistic models of scene space occupancy by different types of obstacle with different material properties, e.g. foliage, watering pipe, grow bag. Then the path planning algorithm can assign different costs to different kinds of collision, e.g. infinite cost to a collision with an immovable object and a lower (and perhaps velocity-dependent) cost to collisions with foliage. By choosing the path with the lowest expected cost, the path planning algorithm can maximize motion efficiency, e.g. by adjusting a trade-off between economy of motion and probability collision with foliage.

10.4. Learning Control Policies by Reinforcement Learning

Given an estimate of the approximate location of target fruit, the system can gain more information about the target (e.g. its shape and size, its suitability for picking, its pose) by obtaining more views from new viewpoints. Information from multiple views can be combined to create a more accurate judgement with respect to the suitability of the fruit for picking and the suitability of a particular approach vector. As a simplistic example, the average colour of a target fruit in multiple views might be used to estimate ripeness. As another example, the best viewpoint might be selected by taking the viewpoint corresponding to the maximum confidence estimation of stalk orientation. However, obtaining more views of the target may be time-consuming. Therefore, it is important (i) to choose the viewpoints that will be provide the most useful additional information for the minimum cost, and (ii) to decide when to stop exploring more viewpoints and attempt to pick the target or abandon it. For illustration:

If a target fruit (or its stem) is partially occluded (by foliage, other fruits, etc.) then it may be valuable to move in the direction required to reduce the amount of occlusion. Generally, it is desirable to find a viewpoint from which the whole fruit is visible without occlusion because such a viewpoint defines, via the back-projected silhouette, a volume of space in which the picking head (and picked fruit) can be moved towards the target fruit without colliding with any other obstacles.

If a target fruit is observed from a viewpoint that makes it hard to determine its pose (or that of its stalk) for picking purposes, then it may be valuable to move to a viewpoint from which it would be easier to determine its pose.

If the target fruit is positioned near other target fruits so that which stalk belongs to which fruit is ambiguous then it may be valuable to obtain another view from a viewpoint in which the stalks can be more easily associated with target fruits.

If approaching the fruit to pick it from the current viewpoint would require a time-consuming move of the Picking Arm (e.g. because some moves require significant reconfiguration of the robot arm's joint angles) then it would be desirable to localize the strawberry from a viewpoint corresponding to a faster move.

Sometimes multiple views will be required to determine with sufficient confidence that the fruit should be picked. Sometimes, it will be unambiguous but rather than obtaining more views it would be better to move on, e.g. leaving the fruit can be picked by human pickers instead. However, designing an effective control routine manually may be prohibitively difficult.

A strategy for doing this is to use reinforcement learning to learn a control policy that decides on what to do next. The control policy maps some state and the current input view to a new viewpoint. The state might include observations obtained using previous views and the configuration of the arm, which could affect the cost of subsequent moves.

To train a control policy via reinforcement learning, it is necessary to define a utility function that rewards success (in this case picking saleable fruit) and penalizes cost (e.g. time spent, energy consumed, etc.). This motivates the idea that a control policy could be trained whilst robots operate in the field, using high quality picking success information using their on-board QC rig to judge picking success. An interesting innovation is that multiple picking robots can be used to explore the space of available control policies in parallel, sharing results amongst themselves (e.g. via a communication network or central server) so that all robots can benefit from using the best-known control policy. However, one limitation of that approach is that it may take a great deal of time to obtain enough training data for an effective control policy to be learned. This gives rise to an important innovation, which is to use for training purposes images of the scene obtained from a set of viewpoints arranged on a grid in camera pose space. Such a dataset might be captured by driving the picking robot under programmatic control to visit each grid point in turn, acquiring a (stereo) image of the scene at each one. Using a training set acquired in this way, reinforcement learning of a control policy can be achieved by simulating the movements of the robot amongst the available viewpoints, accounting for the costs associated with each movement. In simulation, the robot can move between to any of the viewpoints on the grid (under the control of current control policy), perform image processing on each, and decide to pick a target fruit along a hypothesized physical path. It is not possible to be certain that picking a target fruit along a particular path have succeeded in the physical world. However, for some target fruits, merely identifying the correct stalk in a stereo viewpoint gives a high probability of picking success. Therefore, we use correct identification of the stalk of a ripe fruit as a proxy for picking success in reinforcement learning. Ground truth stalk positions may be provided by hand for the training set.

Central to reinforcement learning is some means evaluating the effectiveness of a particular control policy on the dataset. In outline, this is achieved as follows:

1. Set cost=0
2. For each target fruit in dataset
3. Start at a randomly selected nearby viewpoint on grid
4. Update state (includes current pose and suitability for picking estimate) using current view
5. Use current control policy to map state to action (in {Move, Pick, Abandon})
6. Switch (action)

Move:
i. Move Picking Arm to new viewpoint (determined by current policy)
ii. Increase cost by cost of move (function of time taken, power consumed, etc.)
iii. Go to 3

Pick:
i. Increase cost by cost of moving Picking Arm along picking trajectory (determined by current pose estimate)
ii. If picking was successful, decrease cost by value of successful pick
iii. Go to 1 and select next target Abandon:
i. Go to 1 and select next target Using this cost evaluation scheme, we can compare the effectiveness of multiple control policies and select the best, e.g. by exhaustive search over available policies.

10.5. Holistic Robot Control

The reinforcement learning strategy described above relates to control policies for localizing a fruit and determining its suitability for picking given an approximate initial estimate of its position. Note however that the same approach can also be used to train a holistic control policy for the whole robot. This means expanding space of available actions to include (i) moving the Picking Arm to more distant viewpoints (to find coarse initial position estimates for target fruits) and (ii) moving by a given amount along the row of crops. An additional innovation is to extend the reinforcement learning scheme to include actions carried out by human operators, such as manual picking of hard to reach fruit.

11. Miscellaneous Innovations

1. Because picking robots maintain a continuous estimate of their position in a map coordinate system, they can gather geo-referenced data about the environment. A useful innovation is therefore to have robots log undesirable conditions that might require subsequent human intervention along with a map coordinate and possibly a photograph of the scene. Such conditions might include:

damage to the plant or growing infrastructure (e.g. caused by a failed picking attempts or otherwise);

the decision to leave ripe fruit unpicked because picking would incur too great a risk of failure or because the fruit is out of reach of the Picking Arm.

2. A useful and related idea is to have picking robots store the map coordinate system locations of all detected fruit (whether ripe or unripe) in computer memory. This makes possible several innovations:

a. One such innovation is to perform yield mapping to enable the farmer to identify problems such as disease or under- or over-watering early. Of interest might be e.g. the density of fruit production or the proportion of unripe fruits that subsequently mature into ripe fruits.

b. Another innovation is yield prediction. To pick ripe fruits in good time, picking robots must typically traverse every crop row every few days. By acquiring images of ripe and unripe fruits, they can measure the size of individual target fruits as they grow and ripen. Since most unripe fruits will ripen in time, such data facilitates learning predictive models of future crop yield, e.g. in the next day, week, etc. A suitable model might map current and historic ripeness and size estimates for individual target fruits and weather forecast information (e.g. hours of sunlight, temperature) to a crop yield forecast.

c. Another related innovation reduces the amount of time that robots must spend searching for target fruit in the target detection phase of picking. During target detection, the system determines the approximate position of ripe and unripe target fruits. The system typically finds target fruits by moving a camera on the end of the Picking Arm(s) to obtain images from a wide range of viewpoints. However, spending more time searching for target fruits may increase yield but only at the expense of a reduction in picking rate. Therefore, a useful innovation is to store the map coordinate system position of unripe fruits that have been detected but not picked in computer memory so that a robot can locate not-yet-picked target fruits more quickly on a subsequent traversal of the crop row. In a simple embodiment, the position of previously detected but not yet picked fruits is stored so the robot can return directly to the same position on the subsequent traversal without spending time searching. In a more complex embodiment, previous detections are used to form a probability density estimate that reflects the probability of finding ripe fruit at a particular location in map coordinate system space (e.g. by kernel density estimation or otherwise). This density estimate might be used to help a search algorithm prioritize regions of space where ripe fruits are likely to be found and deprioritize regions where they are not. E.g. a simplistic search algorithm might obtain views from a denser sample of viewpoints in regions of space where ripe fruits are likely to be found. In a related innovation, yield prediction (as in (b) above) might be used to account of the impact on time on the ripeness of previously unripe fruits.

3. The picking robot can be equipped to perform several functions in addition to picking, including the ability to spray weeds or pests with suitable herbicides and pesticides, or to reposition trusses (i.e. stalk structures) to facilitate vigorous fruit growth or subsequent picking.

4. Using adjustable arms that can be repositioned to maximize picking efficiency for a particular variety of strawberry or phase of the growing season. Picking Arms can also be positioned asymmetrically to increase the reach of the two arms working in concert (see FIG. 5).

5. In use, it is likely that a robot will lean to one side or other due to ground slope or local non-smoothness of the terrain. This effect may be exacerbated by the use of a suspension system (intended to reduce shock as the robot travels over bumps) because of the compliance of the suspension. An unfortunate consequence of leaning over is that the position of the robot's Picking Arms will not be positioned as designed with respect to the plants (they may be e.g. closer or further, higher or lower). This compromises performance because (i) pre-defined camera poses chosen in the chassis coordinate frame may no longer be optimal if the chassis is rotated and (ii) chassis-relative models of environment geometry (which are used to prevent collisions between Picking Arms and the environment) may also be wrong. One obvious strategy for compensating for the impact of lean on the environment geometry model is to dilate the environment geometry in 3D to provide some tolerance to error, however this reduces performance by compromising the available working volume for the arm (in narrow crop rows, space may already be at a premium). Therefore a valuable innovation is a system both to measure the degree to which the robot is leaning over and then to compensate for the degree of the lean by adapting models of the scene's geometry and camera viewpoints accordingly. The degree of lean might be measured directly using an accelerometer (which measures the vertical direction) or indirectly by measuring the position of a part of the robot (e.g. using a vector cable follower arm or GPS) in a coordinate frame based on the crop row. The lean may then be allowed for by applying an appropriate 3D transformation to pre-defined camera poses and environment geometry. Another means of correcting for lean induced by sloping but smooth terrain is to adjust dynamically the lateral position of the robot's tracks in the row so that the Picking Arms are closer to their design position despite the lean.

6. If a picked fruit is gripped by its stalk, then it may swing like a pendulum following repositioning by a robot arm. This may incur a productivity cost, since for some operations (e.g. placing the fruit into a QC imaging chamber or punnet) the pose of the fruit must be carefully controlled to avoid collisions —which may necessitate pausing arm motion following repositioning until the amplitude of such oscillations decreases to an acceptable level. Therefore a valuable innovation is to use a means of damping to reduce the amplitude the oscillations as soon as possible. In one embodiment, damping is achieved passively, using a soft gripper. In another embodiment, damping is achieved actively by modulating the velocity of the robot arm's end-effector in such a way as to bring the oscillation to a stop as quickly as possible. An estimate of the mass and pendulum length of the strawberry can be used to design a deceleration profile (dynamically or otherwise) required to minimize the amplitude or duration of oscillation.

7. Many of the diseases and other defects that affect soft fruits (and reduce their quality grade) affect their visual appearance in the images obtained by our QC imaging chamber. The first image processing step is to segment in each view the body of the fruit from the calyx (and the background of the imaging chamber). Typically this is achieved by using a decision forest to label pixels. It may also be useful to segment achenes (seeds) at the same time as described below. Then we characterise the appearance of the body of the fruit using a variety of quality measures (which may be innovative in isolation or combination). Some features not previously mentioned include:

a. The spatial distribution of achenes (e.g. in strawberries) or drupelets (e.g. in raspberries). For healthy fruits, achenes and drupelets are generally arranged quite regularly, i.e. the distances between neighbouring achenes and drupelets are generally similar locally. However, some diseases and other problems have the effect of disrupting this regular arrangement in the developing fruit. Therefore an innovative idea is to use a measure of the regularity of the spatial arrangement of achenes or drupelets as an indicator of the quality of the fruit. One approach is to first detect (in images obtained by our QC imaging chamber) the image positions of achenes or drupelets using computer vision and then assign a cost at each such point using an energy function that assigns lowest energy to regularly arranged points. Achenes can be detected by semantic labelling, e.g. by using a decision forest classifier to assign a table to each pixel. Drupelets may be detected e.g. by using a point light source to induce a specular reflection on the shiny surface of the fruit and then detecting local maxima in image brightness. Then the sum of costs over points (or local clusters of points) can be used to give an indication of fruit health.

b. The colour of the achenes. In e.g. strawberries the achenes become redder when the fruit becomes overripe and black when the fruit becomes rotten. Labelled training images of fruits exhibiting particular defects can be used to determine thresholds of acceptability for colour.
  c. The colour of the flesh of the fruit (excluding the achenes). This is a good indicator of under-ripeness, over-ripeness, and localised bruising. Again labelled training data can be used to determine thresholds of acceptabiilty.
  d. The 3D shape of the fruit. An explicit 3D model of the fruit may be obtained by model fitting to the silhouette and image intensity information as described in the existing provisional application. However an 'implicit' 3D model of the shape may be obtained more simply by characterising the 2D shape in each of multiple views. An effective strategy for doing this proceeds one 2D view at a time by first determining the approximate long axis of the fruit and then by characterising shape in a coordinate system aligned with the long axis. The long axis position may be estimated e.g. by the line joining the centroid of the body of the fruit and the image position of the gripper that is used to hold the fruit. Shape may be characterised e.g. by measuring the distance from the centroid of the fruit to the edge of the fruit in each of the clock face directions between 2 o'clock and 10 o'clock given a 9-element vector (noting that we ignore the top of the clock face to avoid the calyx). We can distinguish good (grade 1) shapes from bad (grade 2) shapes using a body of training examples with associated expert-derived ground truth labels. A suitable strategy is k nearest neighbours in the 9D shape space. Robustness to errors in long axis localisation can be achieved by generating multiple 9D shape vectors for randomly perturbed versions of the detected long axis in the training images.
8. Typically, a picked fruit is considered grade 2 (sub-par) or grade 3 (reject) if any of our several independent quality measures give a grade 2 or grade 3 score (although other means of combining defect scores are possible). Note that an important advantage of using image features specifically designed to detect specific kinds of defect instead of a more black-box machine learning approach is that doing so allows us to give the grower a clear and intuitive explanation (or, better, visual indication) for why a particular picked fruit received a particular quality grade. This allows the grower to adjust meaningful thresholds of acceptability for different kinds of defect. In practice, it is commercially very important for growers to make different decisions about the acceptability of different kinds of defect at different times of the season, considering the requirements of different customers, and as a function of productivity and demand.
9. Another application for agricultural robots is the targeted application of chemicals such as herbicides and pesticides. By using computer vision to locate specific parts of the plant or instances of specific kinds of pathogen (insects, dry rot, wet rot, etc.), robots can apply such chemicals only where they are needed, which may be advantageous (in terms of cost, pollution, etc.) compared to treatment systems that require spraying the whole crop. To facilitate doing this kind of work using a robot that is otherwise used for picking it would obviously be advantageous for the robot to support interchangeable end effectors, including one that can be used for picking and one that can be used for spraying. The latter would usually require routing pipes along the length of the robot arm, which may be difficult. However, a useful innovation is to have the spraying end effector contain a small reservoir of liquid chemical—thereby obviating the need for routing pipes. This might be achieved using a cartridge system where the robot arm would visit a station on the chassis to gather a cartridge of chemicals (which might be similar to the cartridges used in inkjet printers). Alternatively the arm might visit a cartridge in the chassis to suck the required liquid chemicals from a cartridge into its reservoir or to expel unused chemical from its reservoir back into a cartridge. It might be that several different types of chemical are combined in dynamically programmable combination to achieve more optimal local treatment, or that multiple cartridges contain multiple different chemical combinations.

The invention claimed is:

1. A robotic fruit picking system comprising an autonomous robot that includes the following subsystems:
  a positioning subsystem configured to autonomously position the robot using a computer implemented guidance system, such as a computer vision guidance system;
  at least one picking arm;
  at least one picking head or other type of end effector, mounted on a picking arm to either cut a stem or branch for a specific fruit or bunch of fruits or pluck that fruit or bunch, and then transfer the fruit or bunch;
  a computer vision subsystem to analyse images of the fruit to be picked or stored;
  a storage subsystem for receiving picked fruit and storing that fruit in containers for storage or transportation, or in punnets for retail; and
  in which the end effector is configured to (a) grip a stem or stalk of a fruit or a bunch of fruits and (b) cut that stem or stalk and/or pluck that fruit or bunch; the end-effector being controlled by the computer vision subsystem to separate the edible and palatable part from at least a part of the stem, branch or stalk without contacting the edible and palatable part;
  and in which the system is configured to estimate a statistical probability that a picking attempt will be successful by taking into account one or more of the following: estimated pose and shape of the target fruit and it's stem or stalk, uncertainty associated with the recovered pose and shape estimates, colour of the target fruit's surface, the proximity of detected obstacles, and the range of viewpoints from which the target fruit is visible, such that a fruit is picked when the estimated picking success is greater than a pre-defined threshold.

2. The robotic fruit picking system of claim 1 that further includes the following subsystem:
  a quality control (QC) subsystem to monitor the quality of fruit that has been picked or could be picked and grade that fruit according to size and/or quality.

3. The robotic fruit picking system of claim 1 that further includes the following subsystem:
  a control subsystem that is programmed with or learns picking strategies.

4. The robotic fruit picking system of claim 1 in which the end effector separates the edible and palatable part of a ripe fruit from its stem or stalk.

5. The robotic fruit picking system of claim 1 in which the end effector maintains the edible and palatable part of a ripe fruit with at least part of the stem or stalk.

6. The robotic fruit picking system of claim 1 in which the system automatically transfers a picked fruit to a suitable storage container held in the storage subsystem such as to minimize handling the edible and palatable part of the fruit or other sensitive parts of the fruit that could be bruised by handling.

7. The robotic fruit picking system of claim 1 in which the picking arm moves an attached camera to allow the computer vision subsystem to locate target fruits and determine their pose and suitability for picking in which suitability for picking is determined by estimating the statistical probability that a picking attempt will be successful by taking into account one or more of the following: the estimated pose and shape of the target fruit and its stem or stalk, uncertainty associated with the recovered pose and shape estimates, color of the target fruit's surface, the proximity of detected obstacles, and the range of viewpoints from which the target fruit is visible.

8. The robotic fruit picking system of claim 1 in which the end effector uses at least the following phases:
(a) a selection phase during which the target fruit is physically partitioned or separated from the plant or tree and/or other fruits growing on the plant/tree and/or growing infrastructure and
(b) a severing phase during which the target fruit is permanently severed from the plant/tree.

9. The robotic fruit picking system of claim 1 in which the end effector includes a hook.

10. The robotic fruit picking system of claim 8 in which the fruit is moved away from its original growing position during the selection phase.

11. The robotic fruit picking system of claim 8 in which a decision phase is introduced after the selection phase and before the severing phase.

12. The robotic fruit picking system of claim 11 in which the decision phase includes rotation of the fruit by its stem or otherwise.

13. The robotic fruit picking system of claim 11 in which the decision phase is used to determine whether or not to sever the fruit, or the manner in which the fruit should be severed.

14. The robotic fruit picking system of claim 8 in which the selection phase is made reversible so as to release the target fruit.

15. The robotic fruit picking system of claim 14 in which the end effector includes a hook and the reversibility of the selection phase is accomplished by a change of shape of the hook.

16. The robotic fruit picking system of claim 14 in which the end effector includes a hook and the reversibility of the selection phase is accomplished by movement or rotation of the hook.

17. The robotic fruit picking system of claim 1 in which the system includes multiple end effectors located on a single multiplexed picking head.

18. The robotic fruit picking system of claim 17 in which multiple picking functions on an end effector are driven off a single actuator or motor, selectively engaged by lightweight means, such as: electromagnets, an engaging pin, rotary tab, or similar.

19. The robotic fruit picking system of claim 18 in which a single motor or actuator drives one function across all end effectors on the head, selectively engaged by means such as: an electromagnet, an engaging pin, rotary tab, or similar.

20. The robotic fruit picking system of claim 18 in which the functions are driven by lightweight means from elsewhere in the system, such as using: a bowden cable, torsional drive cable/spring, pneumatic or hydraulic means.

21. The robotic fruit picking system of claim 1 in which the end effector pulls the target fruit away from the plant in order to determine the fruit's suitability for picking before the fruit is permanently severed from the plant.

22. The robotic fruit picking system of claim 1 in which the end effector comprises a hook with a dynamically programmable trajectory.

23. The robotic fruit picking system of claim 1 in which the end effector uses at least the following phases:
(a) a selection phase during which the target fruit is physically partitioned or separated from the tree and/or other fruits growing on the tree and/or growing infrastructure;
(b) a severing phase during which the target fruit is permanently severed from the tree; and
in which the selection phase is performed by the actuation of a loop, wherein the loop diameter, position and orientation are programmatically controlled.

24. The robotic fruit picking system of claim 1 in which the end effector uses at least the following phases:
(a) a selection phase during which the target fruit is physically partitioned or separated from the tree and/or other fruits growing on the tree and/or growing infrastructure;
(b) a severing phase during which the target fruit is permanently severed from the tree; and
and in which the selection and severing phases are performed by a set of jaws, wherein the jaws diameter and position are programmatically controlled.

25. The robotic fruit picking system of claim 24 in which the jaw attitude such as opened, partially closed or closed is programmatically controlled.

26. A method of selectively storing or punnetising fruit with the optimal flavour or quality by using a robotic fruit picking system comprising an autonomous robot that includes the following subsystems:
a positioning subsystem configured to autonomously position the robot using a computer implemented guidance system, such as a computer vision guidance system;
at least one picking arm;
at least one picking head or other type of end effector, mounted on a picking arm to either cut a stem or branch for a specific fruit or bunch of fruits or pluck that fruit or bunch, and then transfer the fruit or bunch;
a computer vision subsystem to analyse images of the fruit to be picked or stored;
a storage subsystem for receiving picked fruit and storing that fruit in containers for storage or transportation, or in punnets for retail; and
in which the end effector is configured to (a) grip a stem or stalk of a fruit or a bunch of fruits and (b) cut that stem or stalk and/or pluck that fruit or bunch; the end-effector being controlled by the computer vision subsystem to separate the edible and palatable part from at least part of the stem, branch or stalk without contacting the edible and palatable part;
and in which the system is configured to estimate a statistical probability that a picking attempt will be successful by taking into account one or more of the following: estimated pose and shape of the target fruit and it's stem or stalk, uncertainty associated with the recovered pose and shape estimates, colour of the target fruit's surface, the proximity of detected obstacles, and the range of viewpoints from which the target fruit is visible, such that a fruit is picked when the estimated picking success is greater than a pre-defined threshold.

27. The robotic fruit picking system of claim 1 in which the grip and cut phases are combined.

28. The robotic fruit picking system of claim 27 in which the grip and cut phases are combined by means of exploiting the gripping action to pull the stem and/or stalk against a cutting blade or blades.

* * * * *